United States Patent
Jang et al.

(10) Patent No.: US 9,977,540 B2
(45) Date of Patent: *May 22, 2018

(54) TOUCH DISPLAY DEVICE WITH LIGHT SENSOR MODULE

(71) Applicant: LG Display Co., Ltd., Seoul (KR)

(72) Inventors: Hyun-Woo Jang, Seoul (KR); Shi-Cheol Song, Goyang-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/208,270

(22) Filed: Jul. 12, 2016

(65) Prior Publication Data

US 2016/0320917 A1    Nov. 3, 2016

Related U.S. Application Data

(62) Division of application No. 14/067,773, filed on Oct. 30, 2013, now Pat. No. 9,417,736.

(30) Foreign Application Priority Data

Oct. 31, 2012 (KR) .................. 10-2012-0122332

(51) Int. Cl.
G06F 3/041    (2006.01)
G06F 3/042    (2006.01)

(52) U.S. Cl.
CPC .......... *G06F 3/0418* (2013.01); *G06F 3/0421* (2013.01)

(58) Field of Classification Search
None
See application file for complete search history.

(56) References Cited

U.S. PATENT DOCUMENTS

| | | | |
|---|---|---|---|
| 3,860,754 A | 1/1975 | Johnson et al. | |
| 5,774,649 A | 6/1998 | Goh | |
| 6,421,042 B1 | 7/2002 | Omura et al. | |
| 9,417,736 B2 * | 8/2016 | Jang ..................... | G06F 3/0418 |
| 2006/0282711 A1 | 12/2006 | Nurmi et al. | |
| 2007/0024584 A1 | 2/2007 | Wong et al. | |
| 2008/0122824 A1 | 5/2008 | Lee | |
| 2009/0125791 A1 | 5/2009 | Katou et al. | |
| 2009/0268063 A1 | 10/2009 | Ellis-Monaghan et al. | |
| 2010/0097391 A1 | 4/2010 | Ahn et al. | |
| 2010/0110240 A1 | 5/2010 | Thebault et al. | |
| 2010/0128150 A1 | 5/2010 | Taguchi | |
| 2011/0234531 A1 | 9/2011 | Chien et al. | |
| 2012/0105376 A1 | 5/2012 | Park et al. | |

(Continued)

FOREIGN PATENT DOCUMENTS

| | | |
|---|---|---|
| CN | 101727248 A | 6/2010 |
| CN | 102012768 A | 4/2011 |
| KR | 20-0352451 Y1 | 5/2004 |

*Primary Examiner* — Claire X Pappas
*Assistant Examiner* — Benjamin Casarez
(74) *Attorney, Agent, or Firm* — Birch, Stewart, Kolasch & Birch, LLP

(57) ABSTRACT

A touch display device and a light sensor module are discussed. The touch display device includes i light sensor modules, where i is a natural number greater than 1, for sensing a touch applied to a touch display panel, and a malfunction recovery unit for determining whether each of the i light sensor modules malfunctions and restarting at least one of the i light sensor modules when the at least one light sensor module is determined to malfunction.

21 Claims, 21 Drawing Sheets

(56) References Cited

U.S. PATENT DOCUMENTS

2012/0105379 A1     5/2012   Oishi et al.
2012/0256882 A1   10/2012   Christiansson et al.
2014/0085241 A1*   3/2014   Christiansson ....... G06F 3/0418
                                                                          345/173

* cited by examiner

FIG.5

Accumulated data of one light sensor module

| Frame | ① | ② | ③ | ④ | ⑤ | ⑥ | ⑦ | ⑧ | ⑨ | ⑩ |
|---|---|---|---|---|---|---|---|---|---|---|
| Light sense data (500 pixels) | 0 | 500 | 700 | 650 | 600 | 650 | 600 | 700 | 500 | 550 |
| Accumulated data | 0 | 500 | 1200 | 1850 | 2450 | 3100 | 3700 | 4200 | 4700 | 5250 |

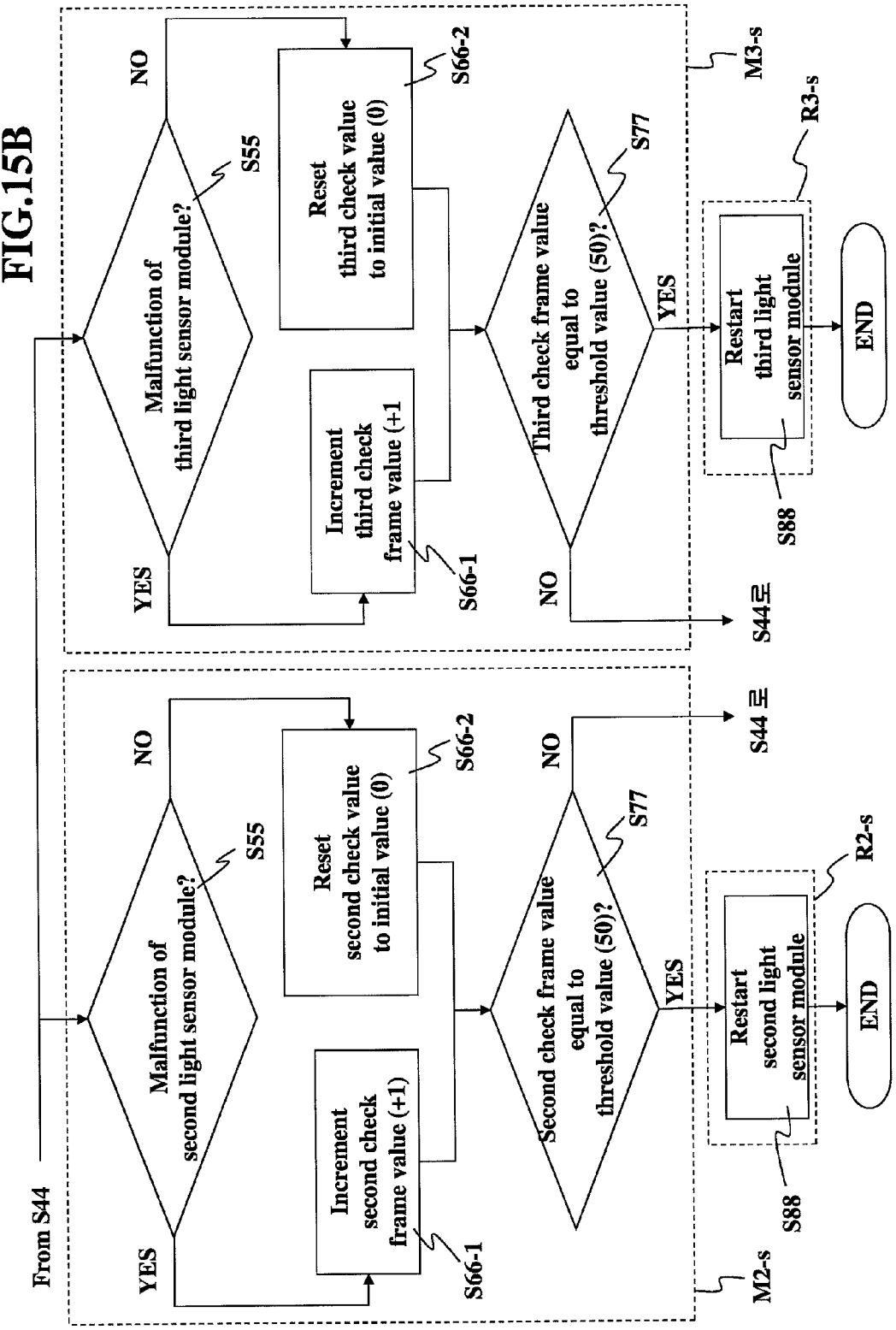

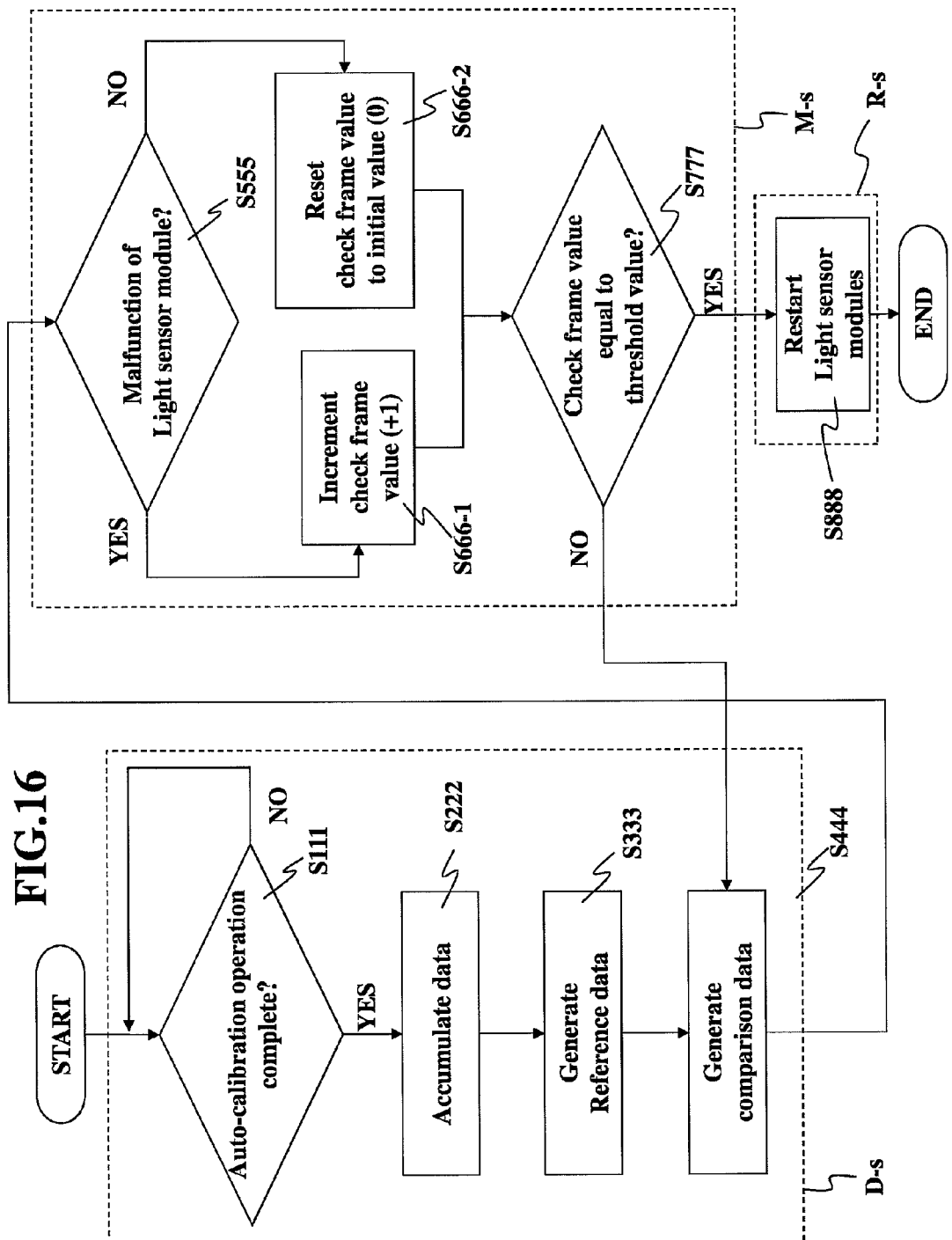

FIG.17

$++(SensorPixel)\{$ $SUM\_cam1 = sum\_cam1 + MCU\_DMA;$ $SUM\_cam2 = sum\_cam2 + MCU\_DMA;$ $SUM\_cam3 = sum\_cam3 + MCU\_DMA;$ $\}$ $ave\_cam1 = SUM\_cam1 / 500$ $ave\_cam2 = SUM\_cam2 / 500$ $ave\_cam3 = SUM\_cam3 / 500$ $total\_cam = (ave\_cam1 + ave\_cam2 + ave\_cam3) / 3$

FIG.18

```
If (each_cam_block_compare_check == True)
{
ESD_check_flag = On;
} if (ESD_check_flag == On){
Continue_repeat_cehck = +1;
} if (Continue_repeat_check == 50)
{
ESD_RECOVER = ON;
}
```

TOUCH DISPLAY DEVICE WITH LIGHT SENSOR MODULE

CROSS-REFERENCE TO RELATED APPLICATIONS

This application is a Divisional of co-pending U.S. application Ser. No. 14/067,773 filed on Oct. 30, 2013, which claims the benefit of Korean Patent Application No. 10-2012-0122332 filed on Oct. 31, 2012, all these applications are hereby incorporated by reference as if fully set forth herein.

BACKGROUND OF THE INVENTION

Field of the Invention

The present invention relates to a touch display device, and more particularly, to a touch display device which is capable of, when static electricity is generated, accurately determining whether light sensor modules malfunction and recovering malfunctioning ones of the light sensor modules, so as to accurately generate touch coordinates.

Discussion of the Related Art

In general, a touch display device is one of a variety of schemes for providing an interface between an information communication device employing various display technologies and the user, and is an input device which enables the user to interface with the information communication device by directly touching a screen by hand or using a pen.

However, the touch display device has a disadvantage of high vulnerability to static electricity because of the aforementioned touch-based interface scheme.

In particular, in the case where the touch display device employs an infrared sensor module system which determines presence/absence of a touch and touch coordinates using infrared light, introduction of static electricity to an infrared sensor module may cause malfunction of the infrared sensor module, resulting in difficulty in accurately calculating the touch coordinates. For example, even if a touch does not actually occur, touch occurrence may be misrecognized, or touch coordinates of a point different from a point actually touched by the user may be misrecognized as touch coordinates of the actually touched point.

SUMMARY OF THE INVENTION

Accordingly, the present invention is directed to a touch display device and a light sensor module recovery method thereof that substantially obviate one or more problems due to limitations and disadvantages of the related art.

An object of the present invention is to provide a touch display device which is capable of finding out and restarting a malfunctioning light sensor module to normally operate it, so as to accurately determine presence/absence of a touch and accurately generate touch coordinates, and a light sensor module recovery method thereof.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a touch display device includes i light sensor modules (where i is a natural number greater than 1) for sensing a touch applied to a touch display panel, and a malfunction recovery unit for determining whether each of the i light sensor modules malfunctions and restarting at least one of the i light sensor modules when the at least one light sensor module is determined to malfunction.

The malfunction recovery unit may determine whether each of the i light sensor modules malfunctions, based on whether static electricity is introduced to a corresponding one of the i light sensor modules.

The malfunction recovery unit may include a data generation unit for generating reference data based on light sense data of mth to nth frames provided from each of the i light sensor modules and generating comparison data based on light sense data of a kth frame (where k is a natural number greater than n) provided from each of the i light sensor modules, a malfunction determination unit for comparing the comparison data from the data generation unit with the reference data therefrom and determining whether the i light sensor modules malfunction, based on a result of the comparison, and a restart control unit for determining whether to restart the at least one of the i light sensor modules, based on a result of the determination of the malfunction determination unit.

The data generation unit may include an accumulated data generator for accumulating the light sense data of the mth to nth frames provided from any one of the i light sensor modules to generate accumulated data of the one light sensor module, and generating accumulated data of the other light sensor modules in the same manner to generate a total of i accumulated data, a reference data generator for dividing the accumulated data of the one light sensor module by the number of pixels formed in the one light sensor module to generate reference unit average data of the one light sensor module, generating reference unit average data of the other light sensor modules in the same manner to generate a total of i reference unit average data, and dividing a sum of the i reference unit average data by i to generate reference total average data, and a comparison data generator for summing up the light sense data of the kth frame provided from the one light sensor module to generate sum data, dividing the sum data by the number of the pixels formed in the one light sensor module to generate comparison unit average data of the one light sensor module, generating comparison unit average data of the other light sensor modules in the same manner to generate a total of i comparison unit average data, and dividing a sum of the i comparison unit average data by i to generate comparison total average data, wherein the i reference unit average data and the reference total average data may be included in the reference data, and wherein the i comparison unit average data and the comparison total average data may be included in the comparison data.

The malfunction determination unit may include a comparator for comparing each of the i comparison unit average data from the data generation unit with a corresponding one of the i reference unit average data from the data generation unit and comparing the comparison total average data with the reference total average data, a counter for increasing a check frame value or resetting the check frame value to an initial value, based on comparison results from the comparator, and a determiner for comparing the check frame value from the counter with a predetermined threshold value and determining that the at least one of the i light sensor modules malfunctions or the i light sensor modules are normal, based on a result of the comparison, wherein the reference data generator may generate reference data based on light sense data of pth to qth frames (where p is a natural number greater than n and q is a natural number greater than p) provided from each of the i light sensor modules when the determiner determines that the at least one light sensor module malfunctions, and wherein the comparison data generator may generate i comparison unit average data and comparison total average data based on light sense data of a (k+1)th frame provided from each of the i light sensor modules when the determiner determines that the i light sensor modules are normal.

The determiner may determine that the at least one of the i light sensor modules malfunctions, when the check frame value is equal to the threshold value, and determine that the i light sensor modules are normal, when the check frame value is less than the threshold value.

The determiner may reset the check frame value to the initial value when the check frame value is equal to the threshold value.

The counter may increment the check frame value by one when the comparison results from the comparator satisfy a condition that each of the i comparison unit average data is greater or less by 10% than the corresponding one of the i reference unit average data and the comparison total average data is greater or less by 10% than the reference total average data, and reset the check frame value to the initial value when the comparison results from the comparator do not satisfy the condition.

The restart control unit may restart the at least one of the i light sensor modules when the determiner determines that the at least one light sensor module malfunctions.

Alternatively, the restart control unit may restart all of the i light sensor modules when the determiner determines that the at least one of the i light sensor modules malfunctions.

The mth to nth frames may be generated immediately after power is applied to the touch display device or immediately after the at least one of the i light sensor modules is restarted.

The malfunction recovery unit may further include i switches each for selecting any one of a restart signal and a sensor driving voltage based on the determination of the restart control unit and transmitting the selected one to a corresponding one of the i light sensor modules.

The restart signal may include an initialization voltage and the sensor driving voltage, which are sequentially generated, wherein the initialization voltage may be generated ahead of the sensor driving voltage.

The touch display device may further include a touch controller for calculating coordinates of the touch based on the light sense data provided from the i light sensor modules, wherein the light sense data provided from the i light sensor modules may be stored in a memory of the touch controller, wherein the light sense data stored in the memory may be read by the data generation unit and the touch controller.

The touch controller may temporarily stop a touch presence/absence determination operation and a touch coordinates calculation operation for a predetermined period of time when the at least one light sensor module is restarted.

The predetermined period of time may be 2 seconds or less.

The touch display device may further include a touch controller for calculating coordinates of the touch based on the light sense data provided from the i light sensor modules and performing an auto-calibration operation for the i light sensor modules, wherein the auto-calibration operation of the touch controller may be performed ahead of a data generation operation of the data generation unit or in a period between a reference data generation operation and a comparison data generation operation of the data generation unit.

Each of the i light sensor modules may be an infrared sensor module which senses the touch using an infrared ray.

The malfunction determination unit may include first to ith comparators each for comparing a corresponding one of the i comparison unit average data from the data generation unit with a corresponding one of the i reference unit average data from the data generation unit and comparing the comparison total average data with the reference total average data, first to ith counters each for increasing a corresponding check frame value or resetting the corresponding check frame value to an initial value, based on comparison results from a corresponding one of the first to ith comparators, and first to ith determiners each for comparing the check frame value from a corresponding one of the first to ith counters with a predetermined threshold value and determining whether a corresponding one of the i light sensor modules malfunctions, based on a result of the comparison, wherein the reference data generator may generate reference data based on light sense data of pth to qth frames (where p is a natural number greater than n and q is a natural number greater than p) provided from each of the i light sensor modules when any one of the determiners determines that the corresponding light sensor module malfunctions, and wherein the comparison data generator may generate i comparison unit average data and comparison total average data based on light sense data of a (k+1)th frame provided from each of the i light sensor modules when the determiners determine that the i light sensor modules are normal.

An rth one of the counters (where r is any one of 1 to i) may increment the corresponding check frame value by one when the comparison results from an rth one of the comparators satisfy a condition that the comparison unit average data of an rth one of the light sensor modules is greater or less by 10% than the reference unit average data of the rth light sensor module and the comparison total average data is greater or less by 10% than the reference total average data, and reset the corresponding check frame value to the initial value when the comparison results from the rth comparator do not satisfy the condition.

The restart control unit may include first to ith restart controllers each for determining whether to restart the corresponding light sensor module, based on a determination result from a corresponding one of the first to ith determiners.

An rth one of the restart controllers (where r is any one of 1 to i) may restart the rth light sensor module when an rth one of the determiners determines that the rth light sensor module malfunctions.

The touch display device may further include a touch controller for calculating coordinates of the touch based on the light sense data provided from the i light sensor modules, wherein the touch controller, when any one of the i light sensor modules is restarted and the remaining two or more light sensor modules are normally driven, may calculate the touch coordinates using the light sense data from the remaining two or more light sensor modules.

The touch display device may further include a touch controller for calculating coordinates of the touch based on the light sense data provided from the i light sensor modules, wherein the touch controller may temporarily stop a touch coordinates calculation operation for a predetermined period of time when at least two of the i light sensor modules are restarted.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 5 is a table illustrating a method of calculating accumulated data of any one light sensor module in FIG. 1;

FIGS. 15A and 15B are flowcharts illustrating a light sensor module recovery method of a touch display device according to a second embodiment of the present invention;

FIG. 16 is a flowchart illustrating a light sensor module recovery method of a touch display device according to a third embodiment of the present invention;

FIG. 17 is a view illustrating equations of accumulated data, reference unit average data and reference total average data in the present invention;

FIG. 18 is a view illustrating, in the form of equations, a step of determining whether light sensor modules malfunction;

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
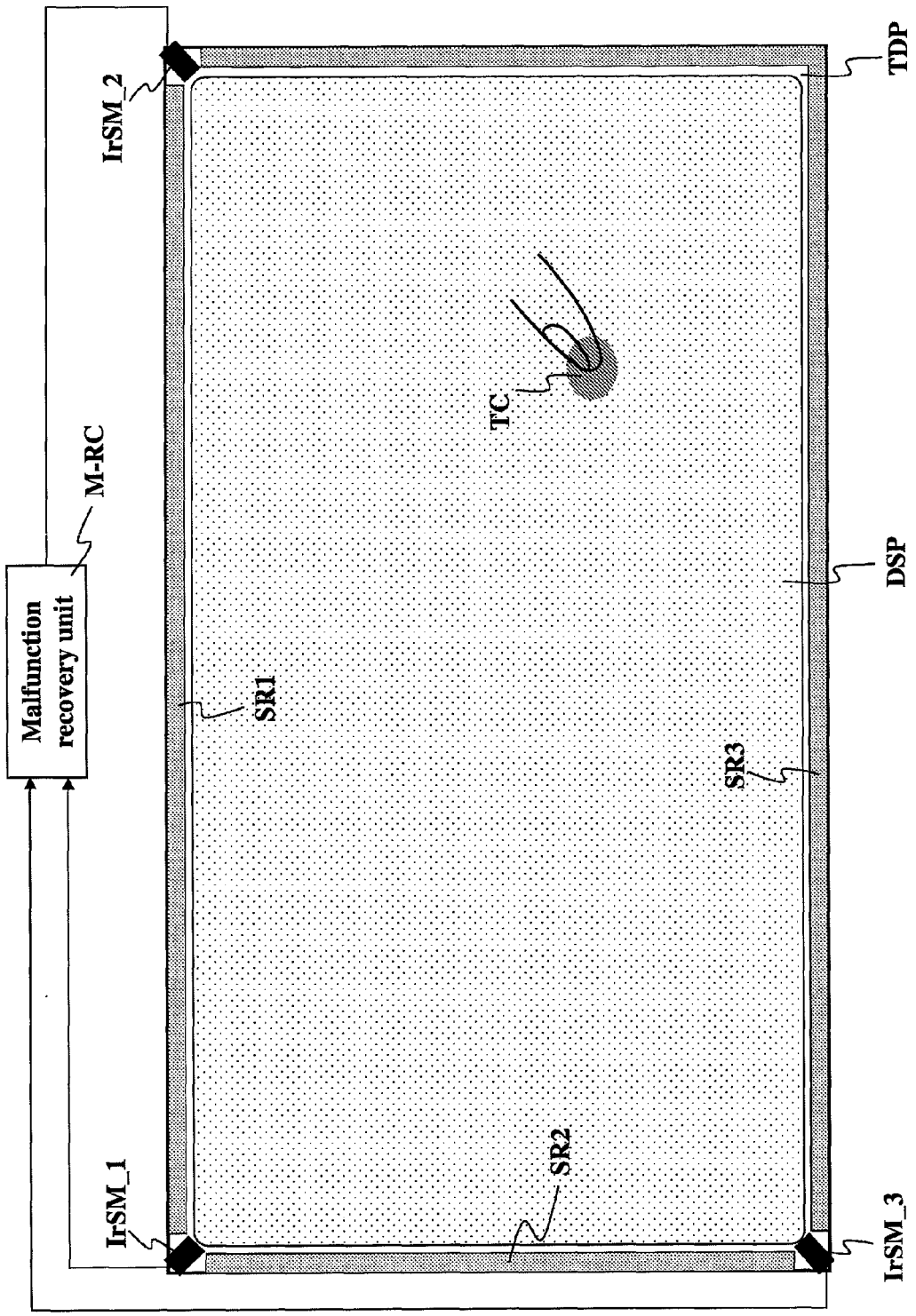
FIG. 1 is a schematic view of a touch display device according to an embodiment of the present invention.

FIG. 1 is a schematic view of a touch display device according to an embodiment of the present invention.

The touch display device according to the present embodiment includes, as shown in FIG. 1, i light sensor modules IrSM_1 to IrSM_3 (where i is a natural number greater than 1) for sensing a touch applied to a touch display panel TDP, and a malfunction recovery unit M-RC for determining whether each of the light sensor modules IrSM_1 to IrSM_3 malfunctions and restarting at least one of the light sensor modules IrSM_1 to IrSM_3 when the at least one light sensor module is determined to malfunction.

The light sensor modules IrSM_1 to IrSM_3 are installed at corners of the touch display panel TDP, as shown in FIG. 1. These installation positions will hereinafter be described in detail with reference to the configuration of the touch display panel TDP.

That is, the touch display panel TDP includes a touch display unit DSP and a plurality of retroreflective plates SR1 to SR3, as shown in FIG. 1. The touch display unit DSP is formed at the center of the touch display panel TDP to display an image. This touch display unit DSP receives a touch from the user and displays an image corresponding to the touch. Each of the touch display panel TDP and touch display unit DSP has a rectangular shape.

The first to third light sensor modules IrSM_1 to IrSM_3 are disposed in the vicinity of outer corners of the touch display panel TDP, respectively. In detail, the first light sensor module IrSM_1 is disposed in the vicinity of a first corner of the touch display panel TDP such that it is positioned between the first retroreflective plate SR1 and the second retroreflective plate SR2, and the second light sensor module IrSM_2 is disposed in the vicinity of a second corner of the touch display panel TDP such that it is positioned between the first retroreflective plate SR1 and the third retroreflective plate SR3. The third light sensor module IrSM_3 is disposed in the vicinity of a third corner of the touch display panel TDP such that it is positioned between the second retroreflective plate SR2 and the third retroreflective plate SR3.

Each of the light sensor modules IrSM_1 to IrSM_3 may be an infrared sensor module which senses a touch using an infrared ray.

Such a light sensor module using an infrared ray (namely, an infrared sensor module) includes an infrared light emitting diode for emitting infrared light, an objective lens for condensing light received by the infrared sensor module, and a photosensor for sensing the light condensed by the objective lens, and an optical filter disposed in front or rear of the objective lens. Infrared light received by the light sensor module is incident on the photosensor through the optical filter and the objective lens. The photosensor may be composed of a line sensor array including a plurality of light receiving elements. This photosensor may have a resolution of 500 pixels or more in a horizontal direction. That is, the photosensor may have 500 pixels or more.

The infrared light emitting diode in the aforementioned light sensor module emits infrared light towards the touch display unit DSP. At this time, the infrared light emitted from the infrared light emitting diode is dispersed within a certain angle. This infrared light is incident on retroreflective plates across the touch display unit DSP and is again reflected therefrom.

The touch display device according to the present invention may employ only one or two light sensor modules. However, the touch display device preferably includes three or more light sensor modules in order to suppress generation of a dead zone and prevent a ghost phenomenon from occurring in the event of a multi-touch. That is, the use of three light sensor modules may have the following effects. When accurate determination as to the number and positions of touches is difficult due to occurrence of the touches on a line interconnecting two adjacent ones of the three light sensor modules, the remaining one light sensor module may determine the number and positions of the touches at a different angle, thereby preventing generation of a dead zone. For example, when a touch occurs within an angle at which it cannot be sensed by the first light sensor module IrSM_1 and the second light sensor module IrSM_2, the third light sensor module IrSM_3 may sense the touch within the same angle.

On the other hand, although not shown, four or more light sensor modules may be employed in the present invention.

The first to third retroreflective plates SR1 to SR3 act to reflect lights (infrared lights) emitted from the respective light sensor modules IrSM_1 to IrSM_3. The first retroreflective plate SR1 is disposed at a first side of the touch display panel TDP, and the second retroreflective plate SR2 is disposed at a second side of the touch display panel TDP. The third retroreflective plate SR3 has an L-like shape. That is, the third retroreflective plate SR3 has one side disposed at a third side of the touch display panel TDP and the other side disposed at a fourth side of the touch display panel TDP. Each of the retroreflective plates SR1 to SR3 includes a plurality of retroreflective layers laminated in a row. Each of the retroreflective layers is composed of a prism.

A structure including the above-stated first to third light sensor modules IrSM_1 to IrSM_3 and first to third retroreflective plates SR1 to SR3 constitutes one touch assembly.

On the other hand, the first light sensor module IrSM_1 receives infrared lights retroreflected from the one side and the other side of the third retroreflective plate SR3. Each of the second and third light sensor modules IrSM_2 and IrSM_3 receives infrared lights retroreflected from at least two of the retroreflective plates SR1 to SR3 and senses infrared light from the other light sensor module which is diagonally opposite thereto.

Here, infrared lights supplied to each of the light sensor modules IrSM_1 to IrSM_3 when no touch is applied to the touch display unit DSP have different intensities from those of infrared lights supplied to each of the light sensor modules IrSM_1 to IrSM_3 under the condition that infrared lights emitted from the light sensor modules IrSM_1 to IrSM_3 are partially intercepted by touch means, such as a finger, which touches a certain point of the touch display unit DSP. In this regard, based on sensed infrared lights from the respective light sensor modules IrSM_1 to IrSM_3, a touch controller (not shown) determines presence/absence of a touch, and determines the position (coordinates) of a touch TC when the touch TC is present.

On the other hand, the malfunction recovery unit M-RC determines whether each of the light sensor modules IrSM_1 to IrSM_3 malfunctions, based on sensed infrared lights from a corresponding one of the light sensor modules IrSM_1 to IrSM_3. That is, provided that an abnormal signal such as static electricity is introduced to the light sensor modules IrSM_1 to IrSM_3, these light sensor modules IrSM_1 to IrSM_3 will malfunction. In this regard, the malfunction recovery unit M-RC of the present invention determines whether static electricity is introduced to the light sensor modules IrSM_1 to IrSM_3, to find out a malfunctioning one of the light sensor modules IrSM_1 to IrSM_3, and restarts the malfunctioning light sensor module or all the light sensor modules including the malfunctioning light sensor module to normally operate the malfunctioning light sensor module. Here, "light sensor module restarting" means electrically resetting the light sensor modules IrSM_1 to IrSM_3, which may, for example, correspond to powering off the light sensor modules IrSM_1 to IrSM_3 and then powering on them again after the lapse of a certain period of time.

On the other hand, the "abnormal signal" may be not only the aforementioned static electricity, but also any electrical signal capable of obstructing the normal operations of the light sensor modules IrSM_1 to IrSM_3. In this regard, the malfunction recovery unit M-RC of the present invention has a function of finding out and recovering, not only errors in the light sensor modules IrSM_1 to IrSM_3 resulting from the static electricity, but also errors in the light sensor modules IrSM_1 to IrSM_3 resulting from other negative signals.

Hereinafter, a representative faulty operation of the light sensor modules IrSM_1 to IrSM_3 resulting from the static electricity, which is one of the aforementioned abnormal signals, will be described with reference to FIG. 2.

Figure 2:
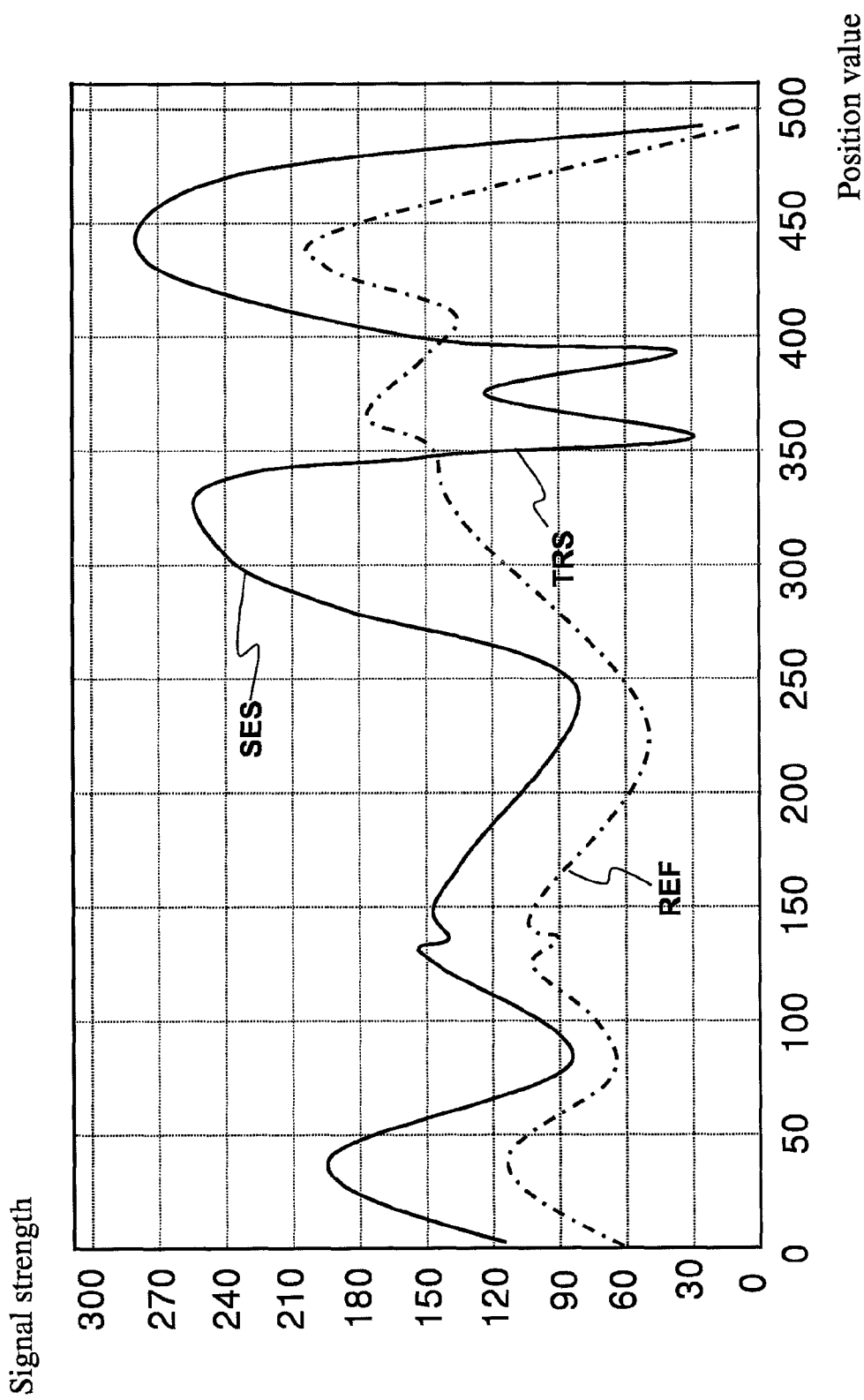
FIG. 2 is a waveform diagram of a reference signal set in any one light sensor module in FIG. 1 and a light sense signal generated therefrom.

FIG. 2 is a waveform diagram of a reference signal set in any one of the light sensor modules IrSM_1 to IrSM_3 in FIG. 1 and a light sense signal generated therefrom, in which a dotted line represents the reference signal and a solid line represents the light sense signal.

The X-axis of FIG. 2 represents pixels of a photosensor provided in the light sensor module, which may be, for example, 500 in number. Here, numerals shown in FIG. 2 represent numbers of the pixels. That is, the 500 pixels are numbered 1 to 500, and, for example, the numeral 50 shown in the X-axis of FIG. 2 represents a number 50 pixel.

The Y-axis of FIG. 2 represents signal strengths of lights received by the respective pixels of the photosensor. For example, the signal strength of light received by the number 50 pixel in FIG. 2 is about 170.

As shown in FIG. 2, when the light sense signal, denoted by SES, is lower in level than the reference signal, denoted by REF, the touch display device recognizes that a certain portion of the touch display unit DSP of the touch display panel is touched. That is, defining a portion of the light sense signal SES having a signal strength lower than that of the reference signal REF as a touch recognition signal TRS, the touch display device may determine the number and positions of touches by determining a section in which the touch recognition signal TRS is generated. In this case, the touch display device may determine the generation section of the touch recognition signal TRS based on the pixel numbers of the X-axis.

For accurate touch coordinates calculation, it is first required to generate the aforementioned reference signal accurately without an error. This reference signal signifies the intensities of infrared lights received by the respective pixels of the light sensor module when infrared light from the light sensor module is emitted to the touch display unit and then returned to the respective pixels of the light sensor module under the condition that no touch is applied to the touch display unit. That is, the intensities of lights received respectively by the 500 pixels are composed of 500 digitized light sense data, and a curve indicated by the dotted line of FIG. 2 is composed of a trace of the 500 light sense data.

On the other hand, the light sense signal is generated based on reception results of infrared light emitted to the touch display unit in an actual driving period of the touch display device. This light sense signal is also composed of 500 digitized light sense data, and a curve indicated by the solid line of FIG. 2 is composed of a trace of the 500 light sense data.

The touch presence/absence determination and the touch coordinates calculation are performed based on a comparison between the light sense signal and the reference signal. For this reason, it is preferable that the reference signal not vary in principle.

However, when an abnormal signal such as static electricity is introduced to the light sensor module, the reference signal set in the light sensor module may vary, thereby making it impossible to accurately determine presence/absence of a touch and accurately calculate touch coordinates.

In contrast, the malfunction recovery unit M-RC according to the present invention monitors the operating states of light sensor modules in real time to find out a malfunctioning one of the light sensor modules, and restarts the malfunctioning light sensor module to normally operate it. Therefore, according to the present invention, even if an external abnormal signal such as static electricity is introduced to the light sensor modules, it is possible to accurately calculate touch coordinates.

This malfunction recovery unit M-RC of the present invention may have a configuration as follows.

On the other hand, for the convenience of description, the number of light sensor modules to be described below is assumed to be three. However, this is nothing but one example proposed for the convenience of description, and four or more light sensor modules may be employed as stated previously.

Figure 3:
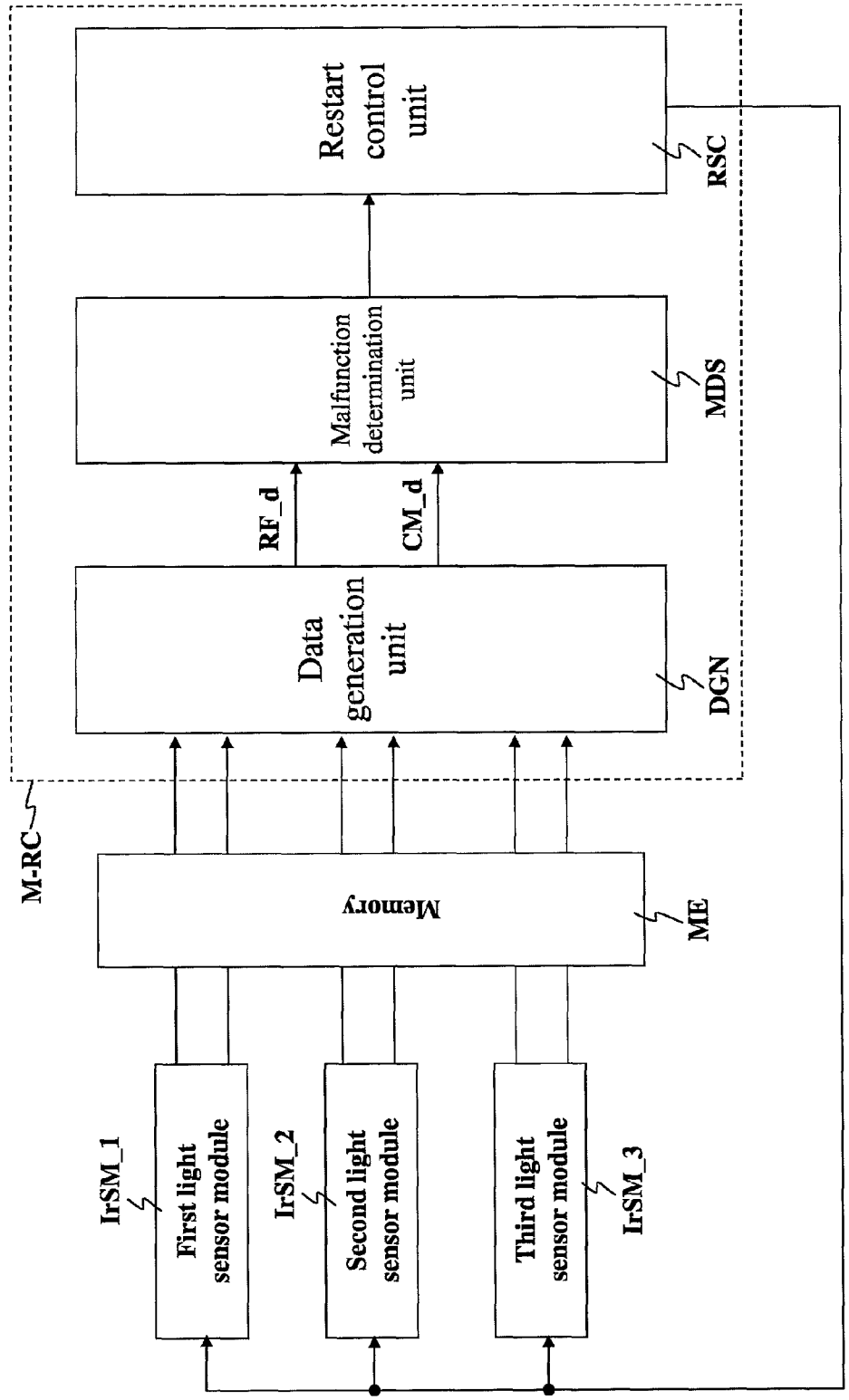
FIG. 3 is a detailed block diagram of a malfunction recovery unit in FIG. 1.

FIG. 3 is a detailed block diagram of the malfunction recovery unit M-RC in FIG. 1.

The malfunction recovery unit M-RC includes a data generation unit DGN, a malfunction determination unit MDS, and a restart control unit RSC, as shown in FIG. 3.

The data generation unit DGN generates reference data RF_d based on light sense data of mth to nth frames provided from each of the three light sensor modules IrSM_1 to IrSM_3. The data generation unit DGN also generates comparison data CM_d based on light sense data of a kth frame (where k is a natural number greater than n) provided from each of the three light sensor modules IrSM_1 to IrSM_3. For example, the data generation unit DGN may generate the reference data RF_d using light sense data of initial ten frames (first to tenth frames) and generate the comparison data CM_d using light sense data of one frame corresponding to a frame (for example, an eleventh frame) subsequent to the initial ten frames.

Here, the mth to nth frames (or pth to qth frames) correspond to consecutive initial frames immediately after power is applied to the touch display device or immediately after at least one light sensor module is restarted. A period corresponding to the initial frames is so very short that there is little probability that an external abnormal signal such as static electricity will be applied to the light sensor modules. Therefore, in the present invention, the reference data RF_d is generated based on light sense data generated in such an initial frame period (namely, the light sense data of the mth to nth frames). Ultimately, this reference data RF_d signifies a normal reference signal with no distortion.

On the other hand, beginning with the kth frame, there is much probability that an external abnormal signal such as static electricity will be applied to the light sensor modules. For this reason, the comparison data CM_d generated in this frame may have a data value distorted by the static electricity or the like.

The malfunction determination unit MDS compares the comparison data CM_d from the data generation unit DGN with the reference data RF_d therefrom and determines whether the three light sensor modules IrSM_1 to IrSM_3 malfunction, based on a result of the comparison. That is, the malfunction determination unit MDS compares the comparison data CM_d with the reference data RF_d, recognizes how much the comparison data CM_d varied from the reference data RF_d, through the comparison result, and determines whether the light sensor modules IrSM_1 to IrSM_3 malfunction, based on a result of the recognition.

The restart control unit RSC determines whether to restart at least one of the light sensor modules IrSM_1 to IrSM_3, based on a result of the determination of the malfunction determination unit MDS. For example, when at least one of the light sensor modules IrSM_1 to IrSM_3 is determined to malfunction, the restart control unit RSC may restart only the malfunctioning light sensor module or all the light sensor modules including the malfunctioning light sensor module.

On the other hand, although the light sense data generated from the three light sensor modules IrSM_1 to IrSM_3 may be supplied directly to the data generation unit DGN, they may be supplied to the data generation unit DGN through a memory ME as shown in FIG. 3. That is, the light sense data of every frame generated from the three light sensor modules IrSM_1 to IrSM_3 may be first stored in the memory ME and then read by the data generation unit DGN. Thereafter, the data generation unit DGN may generate the above-stated reference data RF_d and comparison data CM_d using the read light sense data.

As will be described later, the touch display device of the present invention may further include a touch controller for calculating touch coordinates based on the light sense data provided from all the light sensor modules IrSM_1 to IrSM_3. An internal memory built in the touch controller may be used instead of the above memory ME.

This data generation unit DGN may have a configuration as will hereinafter be described in detail with reference to FIG. 4.

Figure 4:
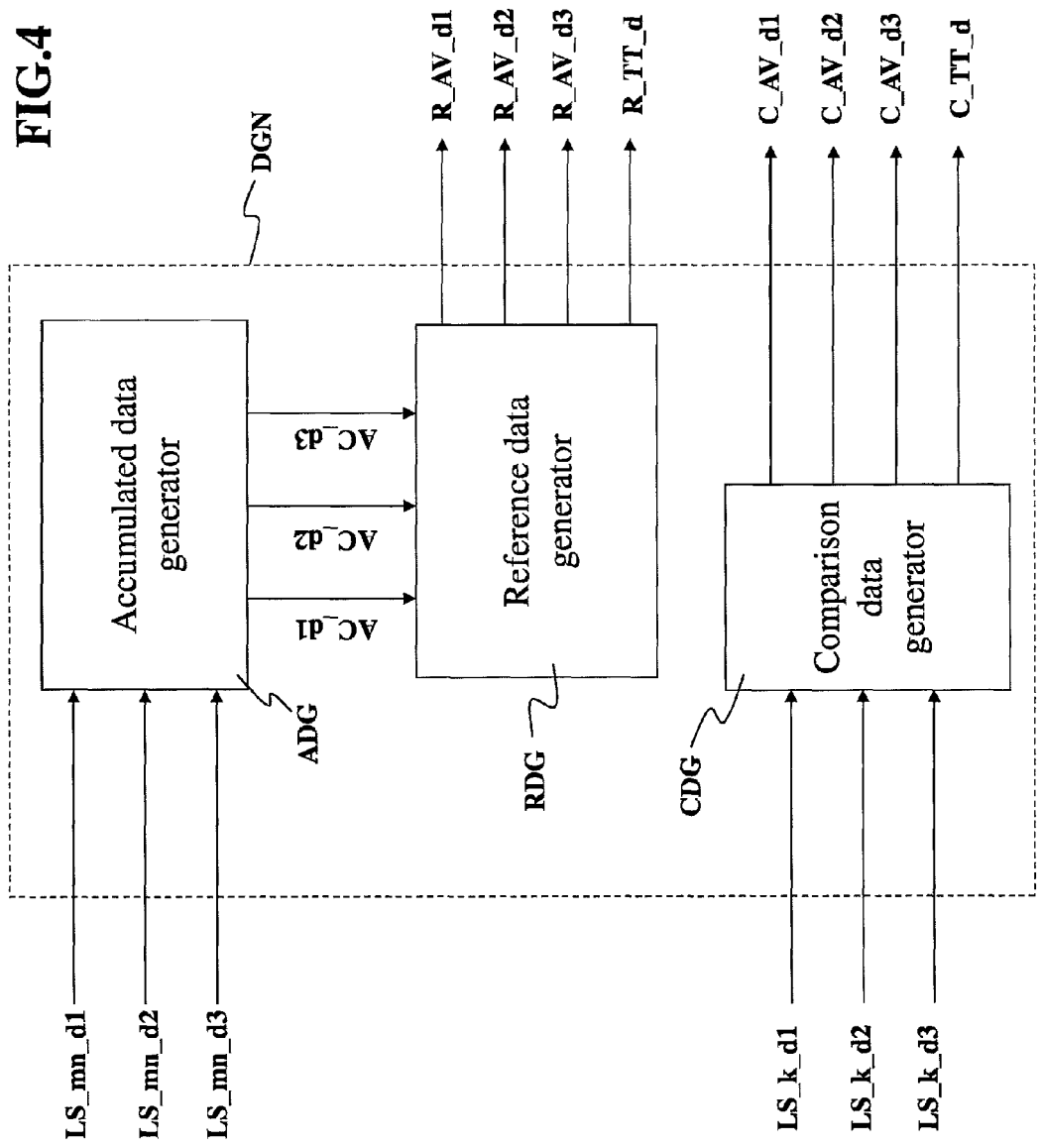
FIG. 4 is a detailed block diagram of a data generation unit in FIG. 3.

FIG. 4 is a detailed block diagram of the data generation unit DGN in FIG. 3.

The data generation unit DGN includes an accumulated data generator ADG, a reference data generator RDG, and a comparison data generator CDG, as shown in FIG. 4.

The accumulated data generator ADG accumulates the light sense data, denoted by LS_mn_d1, of the mth to nth frames provided from the first light sensor module IrSM_1 to generate accumulated data AC_d1 of the first light sensor module IrSM_1. The accumulated data generator ADG also accumulates the light sense data, denoted by LS_mn_d2, of the mth to nth frames provided from the second light sensor module IrSM_2 to generate accumulated data AC_d2 of the second light sensor module IrSM_2. In a similar manner, the accumulated data generator ADG accumulates the light sense data, denoted by LS_mn_d3, of the mth to nth frames provided from the third light sensor module IrSM_3 to generate accumulated data AC_d3 of the third light sensor module IrSM_3. In this manner, the accumulated data generator ADG generates the total three accumulated data AC_d1 to AC_d3. Hereinafter, a detailed example of generating any one accumulated data will be described with reference to FIG. 5.

FIG. 5 is a table illustrating a method of calculating accumulated data of any one light sensor module in FIG. 1.

The first horizontal line of FIG. 5 represents frame numbers which indicate a total of ten frames ① to ⑩ numbered 1 to 10.

The second horizontal line of FIG. 5 represents a sum of light sense data belonging to each frame. For example, provided that the one light sensor module includes 500 pixels, the total number of light sense data of one frame generated from the light sensor module will be 500. That is, 500 light sense data are generated in every frame from the one light sensor module, and a numeral indicated in each cell of the second horizontal line signifies a sum of a total of 500 light sense data generated in a corresponding frame. For example, as shown in FIG. 5, the sum of 500 light sense data corresponding to the number 2 frame ② is "500", and the sum of 500 light sense data corresponding to the number 3 frame ③ is "700".

The third horizontal line of FIG. 5 represents a sum of a sum of light sense data of a current frame (namely, a corresponding frame) and accumulated data of a previous frame. For example, accumulated data 2450 of the number 5 frame (current frame) ⑤ is a sum (namely, 600+1850) of a sum 600 of light sense data of the number 5 frame ⑤ and accumulated data 1850 of the number 4 frame (previous frame) ④.

Therefore, in the case where the light sense data of the ten frames ① to ⑩ have values as shown in FIG. 5, the final accumulated data (accumulated data of the ten frames) has a value of "5250". That is, this value "5250" is the very accumulated data of this one light sensor module.

In this manner, the accumulated data (final accumulated data) of each of all the light sensor modules IrSM_1 to IrSM_3 is generated by the accumulated data generator ADG of the data generation unit DGN.

On the other hand, the light sense data and accumulated data of the initial number 1 frame ① generally have an initial value of 0, as shown in FIG. 5. For this reason, in order to minimize such deviation, the above accumulated data may be generated using data of frames other than the number 1 frame.

Referring again to FIG. 4, the reference data generator RDG divides the accumulated data AC_d1 of the first light sensor module IrSM_1 by the number (for example, 500) of pixels formed in the first light sensor module IrSM_1 to generate reference unit average data R_AV_d1 of the first light sensor module IrSM_1. The reference data generator RDG also divides the accumulated data AC_d2 of the second light sensor module IrSM_2 by the number of pixels formed in the second light sensor module IrSM_2 to generate reference unit average data R_AV_d2 of the second light sensor module IrSM_2. In a similar manner, the reference data generator RDG divides the accumulated data AC_d3 of the third light sensor module IrSM_3 by the number of pixels formed in the third light sensor module IrSM_3 to generate reference unit average data R_AV_d3 of the third light sensor module IrSM_3. In addition, the reference data generator RDG divides a sum of the three reference unit average data R_AV_d1 to R_AV_d3 by 3 (the number of the light sensor modules) to generate reference total average data R_TT_d.

In this manner, the reference data generator RDG generates the total three reference unit average data R_AV_d1 to R_AV_d3 and the one reference total average data R_TT_d.

As shown in FIG. 4, the comparison data generator CDG sums up the light sense data, denoted by LS_k_d1, of the kth frame (for example, the eleventh frame) provided from the first light sensor module IrSM_1 to generate sum data (a sum of 500 light sense data), and divides the sum data by the number (for example, 500) of pixels formed in the first light sensor module IrSM_1 to generate comparison unit average data C_AV_d1 of the first light sensor module IrSM_1. The comparison data generator CDG also sums up the light sense data, denoted by LS_k_d2, of the kth frame (for example, the eleventh frame) provided from the second light sensor module IrSM_2 to generate sum data, and divides the sum data by the number (for example, 500) of pixels formed in the second light sensor module IrSM_2 to generate comparison unit average data C_AV_d2 of the second light sensor module IrSM_2. In a similar manner, the comparison data generator CDG sums up the light sense data, denoted by LS_k_d3, of the kth frame (for example, the eleventh frame) provided from the third light sensor module IrSM_3 to generate sum data, and divides the sum data by the number (for example, 500) of pixels formed in the third light sensor module IrSM_3 to generate comparison unit average data C_AV_d3 of the third light sensor module IrSM_3. In addition, the comparison data generator CDG divides a sum of the three comparison unit average data C_AV_d1 to C_AV_d3 by 3 (the number of the light sensor modules) to generate comparison total average data C_TT_d.

In this manner, the comparison data generator CDG generates the total three comparison unit average data C_AV_d1 to C_AV_d3 and the one comparison total average data C_TT_d.

Here, the three reference unit average data R_AV_d1 to R_AV_d3 and the one reference total average data R_TT_d are included in the above-stated reference data RF_d. In other words, one set of three reference unit average data R_AV_d1 to R_AV_d3 and one reference total average data R_TT_d is considered to be one reference data RF_d.

In a similar manner, the three comparison unit average data C_AV_d1 to C_AV_d3 and the one comparison total average data C_TT_d are included in the above-stated comparison data CM_d. In other words, one set of three comparison unit average data C_AV_d1 to C_AV_d3 and one comparison total average data C_TT_d is considered to be one comparison data CM_d.

Figure 6:
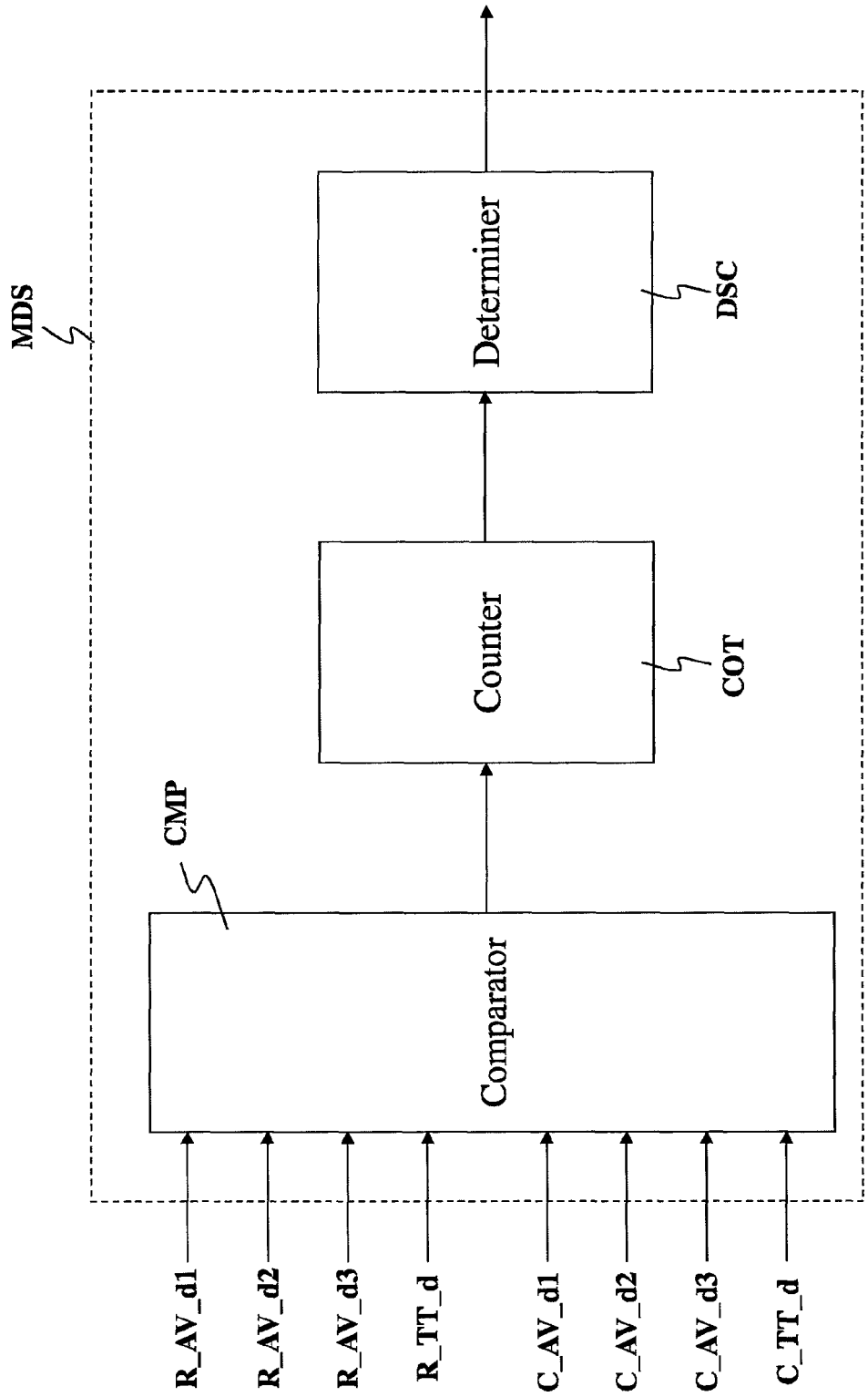
FIG. 6 is a detailed block diagram of a malfunction determination unit in FIG. 3.

FIG. 6 is a detailed block diagram of the malfunction determination unit MDS in FIG. 3.

The malfunction determination unit MDS includes a comparator CMP, a counter COT, and a determiner DSC, as shown in FIG. 6.

The comparator CMP compares each of the three comparison unit average data C_AV_d1 to C_AV_d3 from the data generation unit DGN with a corresponding one of the three reference unit average data R_AV_d1 to R_AV_d3 from the data generation unit DGN. For example, the comparison unit average data C_AV_d1 of the first light sensor module IrSM_1 (referred to hereinafter as first comparison unit average data) is compared with the reference unit average data R_AV_d1 of the first light sensor module IrSM_1 (referred to hereinafter as first reference unit average data), and the comparison unit average data C_AV_d2 of the second light sensor module IrSM_2 (referred to hereinafter as second comparison unit average data) is compared with the reference unit average data R_AV_d2 of the second light sensor module IrSM_2 (referred to hereinafter as second reference unit average data). The comparison unit average data C_AV_d3 of the third light sensor module IrSM_3 (referred to hereinafter as third comparison unit average data) is compared with the reference unit average data R_AV_d3 of the third light sensor module IrSM_3 (referred to hereinafter as third reference unit average data). In addition, the comparator CMP compares the comparison total average data C_TT_d with the reference total average data R_TT_d.

The counter COT adjusts a check frame value based on the comparison results from the comparator CMP. For example, based on the comparison results, the counter COT increments the check frame value by one or resets the check frame value to an initial value (for example, 0).

The operations of the comparator CMP and counter COT will hereinafter be described in detail with reference to the following example.

That is, as one example, when the comparison results from the comparator CMP satisfy a condition that each of the comparison unit average data C_AV_d1 to C_AV_d3 is greater or less by 10% than the corresponding one of the reference unit average data R_AV_d1 to R_AV_d3 and the comparison total average data C_TT_d is greater or less by 10% than the reference total average data R_TT_d, the counter COT increments the check frame value by one. In detail, when the comparison results from the comparator CMP satisfy a condition that the first comparison unit average data C_AV_d1 is greater or less by 10% than the first reference unit average data R_AV_d1, the second comparison unit average data C_AV_d2 is greater or less by 10% than the second reference unit average data R_AV_d2, the third comparison unit average data C_AV_d3 is greater or less by 10% than the third reference unit average data R_AV_d3 and the comparison total average data C_TT_d is greater or less by 10% than the reference total average data R_TT_d, the counter COT increments the check frame value in the corresponding frame by one. Conversely, when this condition is not satisfied, the counter COT resets the check frame value to the initial value 0.

The determiner DSC compares the check frame value from the counter COT with a predetermined threshold value and determines whether at least one of the three light sensor modules malfunctions, based on a result of the comparison. That is, based on the comparison result, the determiner DSC determines that any one of the three light sensor modules malfunctions or all of the three light sensor modules are normal.

For example, when the check frame value is equal to the threshold value, the determiner DSC finally determines that at least one of the three light sensor modules malfunctions. That is, at the moment that the check frame value reaches the threshold value while being incremented by one in every frame, the determiner DSC determines that any one light sensor module malfunctions. In other words, when the above condition is successively satisfied in frames of a number corresponding to the threshold value, the determiner DSC finally determines that the at least one light sensor module malfunctions.

In contrast, when the check frame value is less than the threshold value, the determiner DSC determines that the three light sensor modules are normal. Here, the threshold value may be, for example, 50. In conclusion, in the case where the check frame value is successively increased in several frames (for example, 50 frames) (namely, in the case where malfunction is successively detected in the several frames), the determiner DSC finally determines that any one light sensor module malfunctions. The reason is that an abnormal signal discontinuously generated in less than 50 frames may be considered to be ignorable noise, not an abnormal signal such as static electricity.

When the determiner DSC finally determines the at least one light sensor module to malfunction, in this manner, the above-stated restart control unit RSC of FIG. 3 restarts the at least one light sensor module.

On the other hand, when the at least one light sensor module is finally determined to malfunction by the determiner DSC and then restarted by the restart control unit RSC, the reference data generator RDG generates reference data RF_d based on light sense data of pth to qth frames (where p is a natural number greater than n and q is a natural number greater than p) provided from each of the three light sensor modules IrSM_1 to IrSM_3. Namely, when at least one of the light sensor modules IrSM_1 to IrSM_3 malfunctions, it is restarted. In this case, it is required to generate new reference data RF_d based on other light sense data (light sense data corresponding to initial frames) generated from all the light sensor modules including the restarted light sensor module. For this reason, after the above restarting, the reference data generator RDG generates new reference data RF_d based on the light sense data of the pth to qth frames (for example, other initial ten frames). At this time, because the check frame value has also already reached the threshold value, it is reset to the initial value 0.

On the other hand, when the determiner DSC determines that the three light sensor modules IrSM_1 to IrSM_3 are normal, the comparison data generator CDG generates three comparison unit average data and one comparison total average data based on light sense data of a (k+1)th frame (for example, a twelfth frame) provided from each of the first to third light sensor modules IrSM_1 to IrSM_3. Namely, in the case where it is determined that all the light sensor modules are normal in the current frame (the eleventh frame), based on the analysis results of the light sense data of that frame, light sense data corresponding to a next frame are analyzed in the above manner for a determination as to whether the light sensor modules malfunction in the next frame. At this time, the check frame value is also reset to the initial value 0.

The mth to nth frames (or the pth to qth frames) correspond to consecutive frames immediately after power is applied to the touch display device or immediately after at least one light sensor module is restarted. In the above example, the mth to nth frames correspond to consecutive frames immediately after power is applied to the touch display device, and the pth to qth frames correspond to consecutive frames immediately after at least one light sensor module is restarted.

On the other hand, the malfunction recovery unit M-RC may further include three switches, as will hereinafter be described in detail with reference to FIG. 7.

Figure 7:
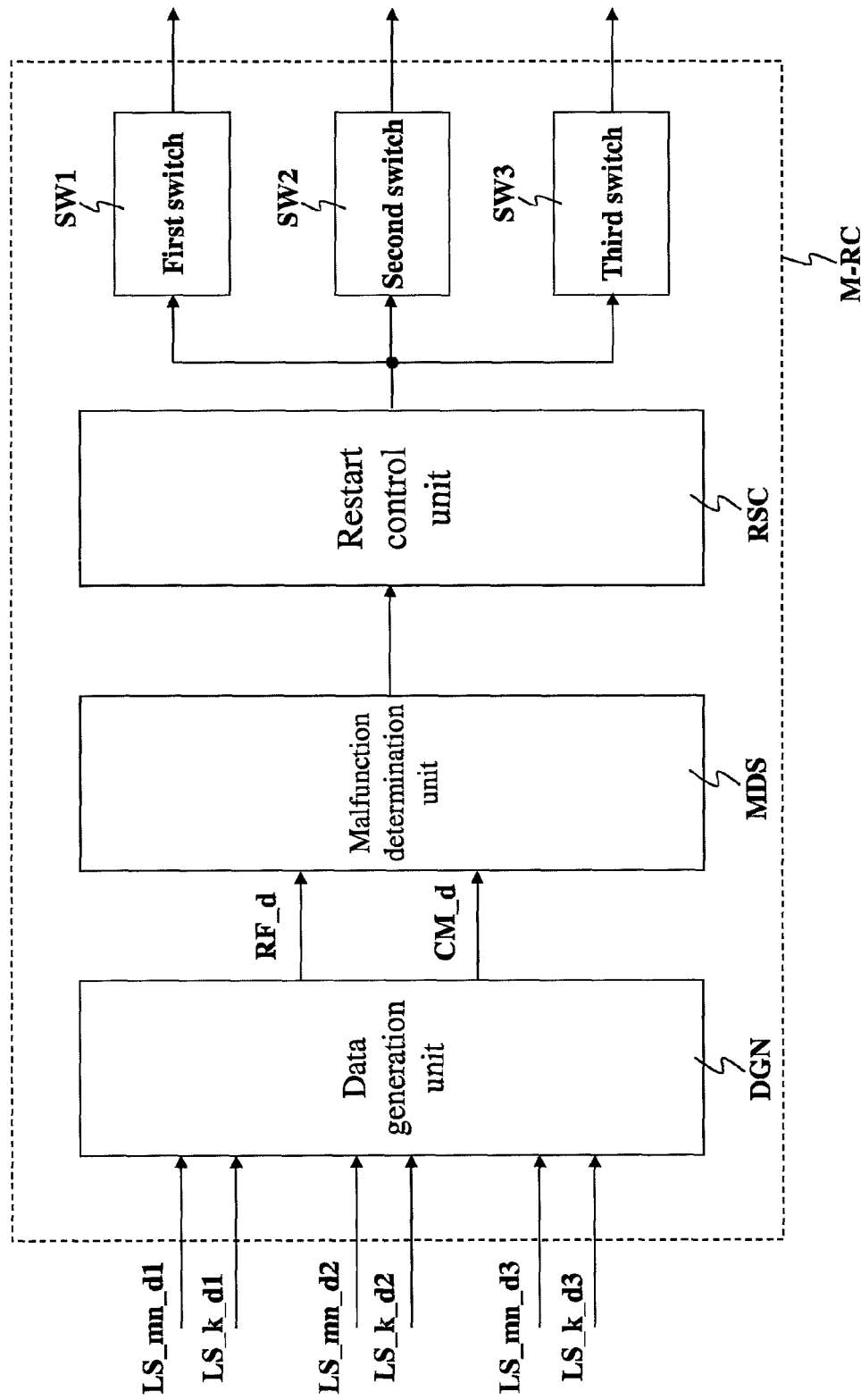
FIG. 7 is a detailed block diagram showing another configuration of the malfunction recovery unit in FIG. 1 including switches.

FIG. 7 is a detailed block diagram showing another configuration of the malfunction recovery unit M-RC including switches.

First to third switches SW1 to SW3 are shown in FIG. 7.

The first switch SW1 selects any one of a restart signal and a sensor driving voltage based on the determination of the restart control unit RSC and transmits the selected one to the first light sensor module IrSM_1.

The second switch SW2 selects any one of the restart signal and the sensor driving voltage based on the determination of the restart control unit RSC and transmits the selected one to the second light sensor module IrSM_2.

The third switch SW3 selects any one of the restart signal and the sensor driving voltage based on the determination of the restart control unit RSC and transmits the selected one to the third light sensor module IrSM_3.

Here, a signal based on the determination of the restart control unit RSC may be supplied in common to the first to third switches SW1 to SW3. For example, upon determining to restart at least one of the light sensor modules IrSM_1 to IrSM_3, the restart control unit RSC generates a restart determination signal and supplies the generated restart determination signal to each of the first to third switches SW1 to SW3. Then, the first switch SW1 switches and transmits the restart signal to the first light sensor module IrSM_1, the second switch SW2 switches and transmits the restart signal to the second light sensor module IrSM_2, and the third switch SW3 switches and transmits the restart signal to the third light sensor module IrSM_3. In the case where all of the three switches SW1 to SW3 are supplied with the same restart determination signal to switch the restart signal in common in this manner, the three light sensor modules IrSM_1 to IrSM_3 are restarted at the same time.

Here, the restart signal is composed of an initialization voltage and the sensor driving voltage, which are sequentially generated. The initialization voltage is generated ahead of the sensor driving voltage. In these initialization voltage and sensor driving voltage constituting the restart signal, the initialization voltage is maintained only for a certain period of time, and the sensor driving voltage is generated immediately after the end of the maintenance period. The sensor driving voltage is maintained until the initialization voltage is again generated.

Each light sensor module is powered off by the initialization voltage and then powered on again by the sensor driving voltage.

The initialization voltage may be a ground voltage of 0V, and the sensor driving voltage may be a constant voltage of 3.3V.

Figure 8:
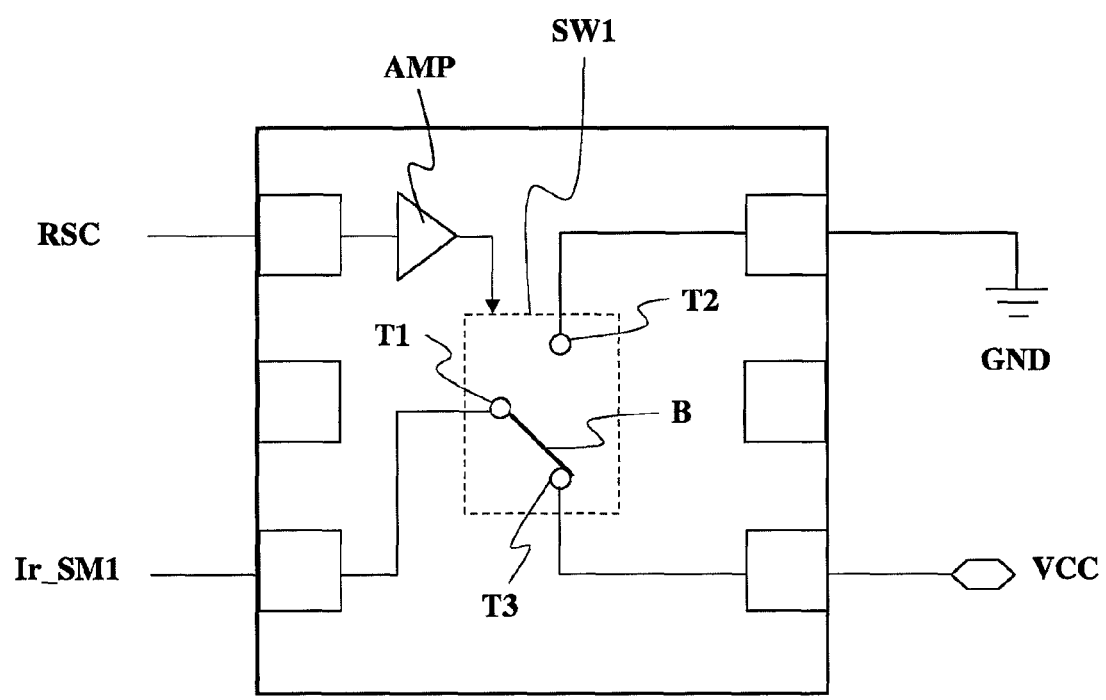
FIG. 8 is a detailed block diagram of any one of the switches in FIG. 7.

FIG. 8 is a detailed block diagram of any one of the switches SW1 to SW3 in FIG. 7.

Any one of the switches SW1 to SW3, for example, the first switch SW1 includes a ground terminal T2, a drive terminal T3, a module terminal T1, and a connection adjuster B, as shown in FIG. 8. The ground terminal T2 is grounded, the drive terminal T3 is supplied with the sensor driving voltage, denoted by VCC, and the module terminal T1 is connected to the first light sensor module IrSM_1. The connection adjuster B has one side fixedly connected to the module terminal T1 and the other side connected to the ground terminal T2 or drive terminal T3 depending on logic of the restart determination signal. An amplifier AMP outputs a first control voltage when the restart determination signal has a digital value of "0", and a second control voltage when the restart determination signal has a digital value of "1".

In response to the first control voltage, the other side of the connection adjuster B is connected to the drive terminal T3. In contrast, in response to the second control voltage, the other side of the connection adjuster B is first connected to the ground terminal T2 and then to the drive terminal T3. That is, the other side of the connection adjuster B is sequentially connected to the ground terminal T2 and the drive terminal T3 by the second control voltage. This operation of the first switch SW1 will hereinafter be described in detail with reference to FIG. 9.

Figure 9:
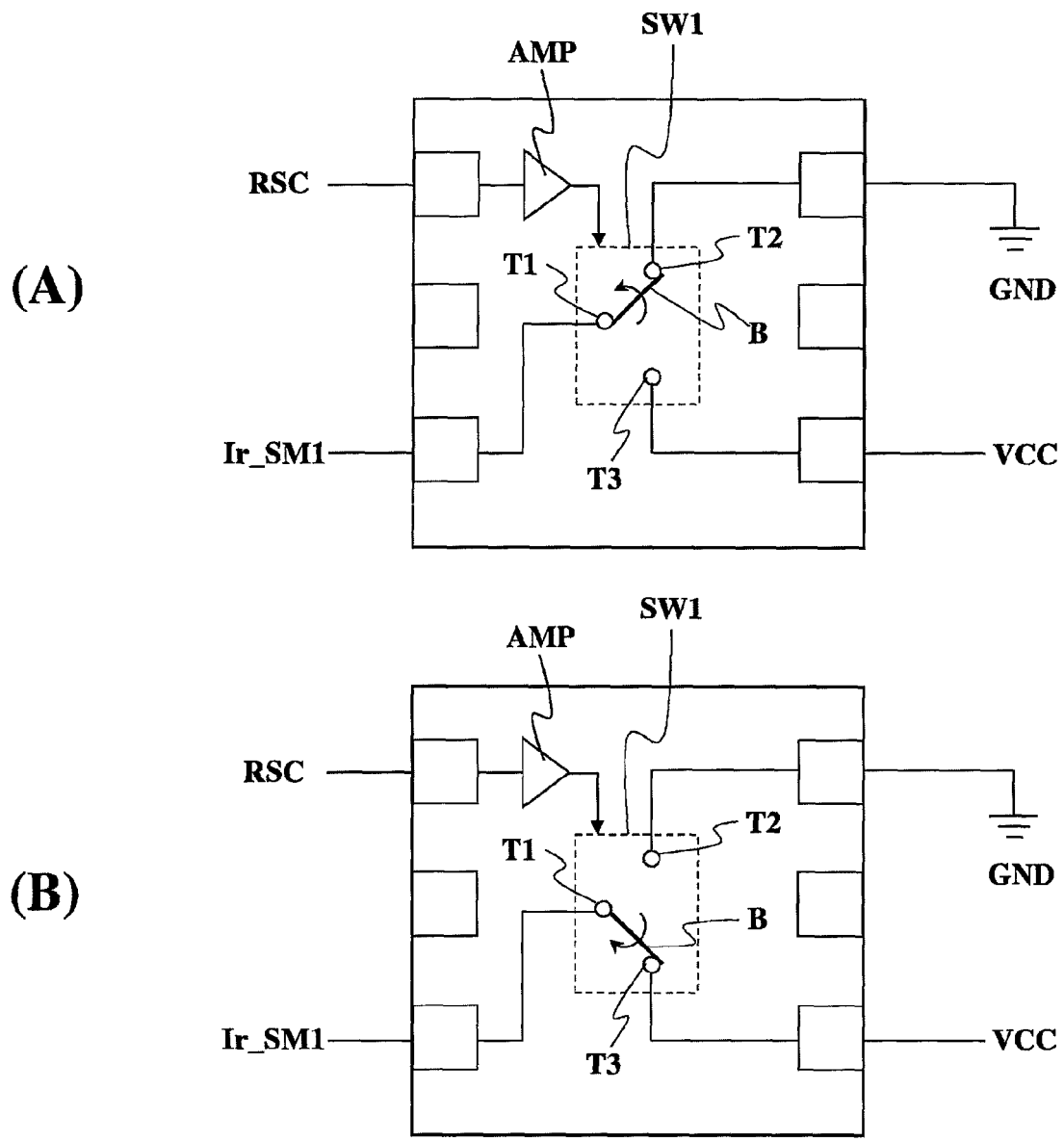
FIG. 9 is a detailed block diagram illustrating the operation of the switch of FIG. 8.

FIG. 9 is a detailed block diagram illustrating the operation of the switch of FIG. 8.

When the second control voltage is applied to the first switch SW1, the other side of the connection adjuster B is first connected to the ground terminal T2, as shown in FIG. 9(a). Then, after the lapse of a certain period of time, the other side of the connection adjuster B is moved from the ground terminal T2 to the drive terminal T3, as shown in FIG. 9(b). As a result, the other side of the connection adjuster B is connected to the drive terminal T3. In this manner, the other side of the connection adjuster B is sequentially connected to the ground terminal T2 and the drive terminal T3 by the second control voltage. Therefore, the initialization voltage (ground voltage GND) and the sensor driving voltage VCC are sequentially applied to the first light sensor module IrSM_1, so as to restart this first light sensor module IrSM_1.

The second and third switches SW2 and SW3 are also the same in configuration as the first switch SW1, with the exception that the module terminal T1 of the second switch SW2 is connected to the second light sensor module IrSM_2 and the module terminal T1 of the third switch SW3 is connected to the third light sensor module IrSM_3.

Figure 10:
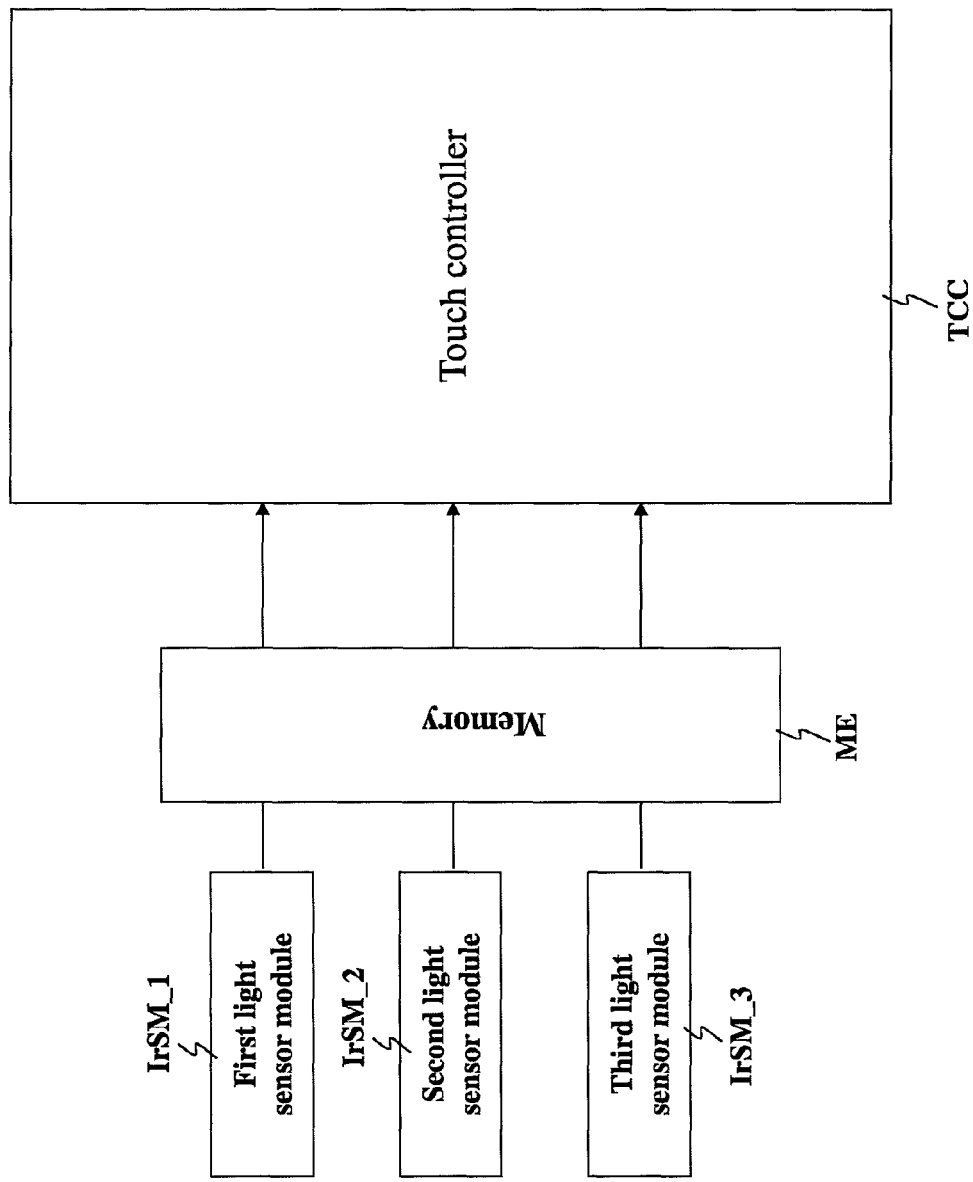
FIG. 10 is a block diagram illustrating a connection relationship among light sensor modules, a memory and a touch controller.

FIG. 10 is a block diagram illustrating a connection relationship among light sensor modules, a memory ME and a touch controller TCC.

As described above, the touch display device according to the present invention may further include the touch controller TCC. Based on the sensed infrared lights from the first to third light sensor modules IrSM_1 to IrSM_3, the touch controller TCC determines presence/absence of a touch, and calculates the coordinates of a touch when the touch is present.

On the other hand, although the light sense data generated from the three light sensor modules IrSM_1 to IrSM_3 may be supplied directly to the touch controller TCC, they may be supplied to the touch controller TCC through the memory ME as shown in FIG. 10. That is, the light sense data of every frame generated from the three light sensor modules IrSM_1 to IrSM_3 may be first stored in the memory ME and then read by the touch controller TCC. Thereafter, using the read light sense data, the touch controller TCC may determine presence/absence of a touch and calculate touch coordinates.

The memory ME may be built in the touch controller TCC. On the other hand, the memory ME in FIG. 10 may be the same as the memory ME in FIG. 3. That is, one memory ME may be built in the touch controller TCC, and used together by the touch controller TCC and the data generation unit DGN.

On the other hand, when at least one light sensor module is restarted, the touch controller TCC may temporarily stop the touch coordinates calculation operation for a predetermined period of time. For example, in the case where the first and second light sensor modules IrSM_1 and IrSM_2 among the three light sensor modules IrSM_1 to IrSM_3 are finally determined to malfunction and only they are then selectively restarted, no light sense data is generated from the first and second light sensor modules IrSM_1 and IrSM_2 for this restart period. As a result, for this restart period, the touch controller TCC has no choice but to determine presence/absence of a touch and touch coordinates using only the light sense data from the remaining third light sensor module IrSM_3 which normally operates.

However, the presence/absence of a touch and the touch coordinates determined based on only light sense data from one light sensor module are so very inaccurate that incorrect information may be transmitted to the user.

Therefore, in the present invention, the touch controller TCC is controlled such that it does rather not perform the above touch-associated processing operations (the touch presence/absence determination operation, touch coordinates calculation operation, touch algorithm execution operation, etc.) for the restart period, thereby fundamentally preventing incorrect information from being transmitted to the user from the very first. To this end, the restart determination signal from the restart control unit RSC may also be transmitted to the touch controller TCC. When the restart determination signal is "1" in logic, the touch controller TCC stops the above touch-associated processing operations for a predetermined no-response period. Thereafter, when the no-response period has elapsed, the touch controller TCC performs the above operations again. Here, the no-response period may be longer than or equal to the above restart period. As another example, the no-response period may be set to 2 seconds or less.

On the other hand, the touch controller TCC may further perform an operation of automatically calibrating all light sensor modules. This auto-calibration operation will hereinafter be described in detail.

This auto-calibration operation is shown in Korean Patent Laid-open Publication No. 10-2012-0045665 (hereinafter referred to as a reference document), filed on Oct. 29, 2010 by the same applicant (LG Display Co., Ltd). According to an automatic angle setting method of an infrared sensor module (light sensor module) disclosed in this reference document, an optimum effective viewing angle area is reset with respect to each infrared sensor module based on a reference point, a start point and an end point. An infrared sensor module and an auto-calibration algorithm thereof disclosed in this reference document may be applied to the present invention. Refer to the above reference document with respect to a detailed description of the infrared sensor module and the auto-calibration algorithm thereof.

Here, the auto-calibration operation applied to the present invention may be performed ahead of the above-stated data generation operation of the data generation unit DGN. In detail, the auto-calibration operation may be performed immediately after the touch display device is powered on. Then, after this auto-calibration operation is completed, reference data RF_d and comparison data CM_d may be generated from the data generation unit DGN based on light sense data from light sensor modules subjected to auto-calibration.

Alternatively, the auto-calibration operation applied to the present invention may be performed in a period between the reference data RF_d generation operation of the data generation unit DGN and the comparison data CM_d generation operation thereof. In other words, the auto-calibration operation may be started after reference data RF_d is generated. Then, after this auto-calibration operation is completed, the comparison data CM_d generation operation may be performed.

On the other hand, the malfunction determination unit MDS in FIG. 3 may have, instead of the configuration shown in FIG. 6, a configuration as will hereinafter be described in detail with reference to FIG. 11.

Figure 11:
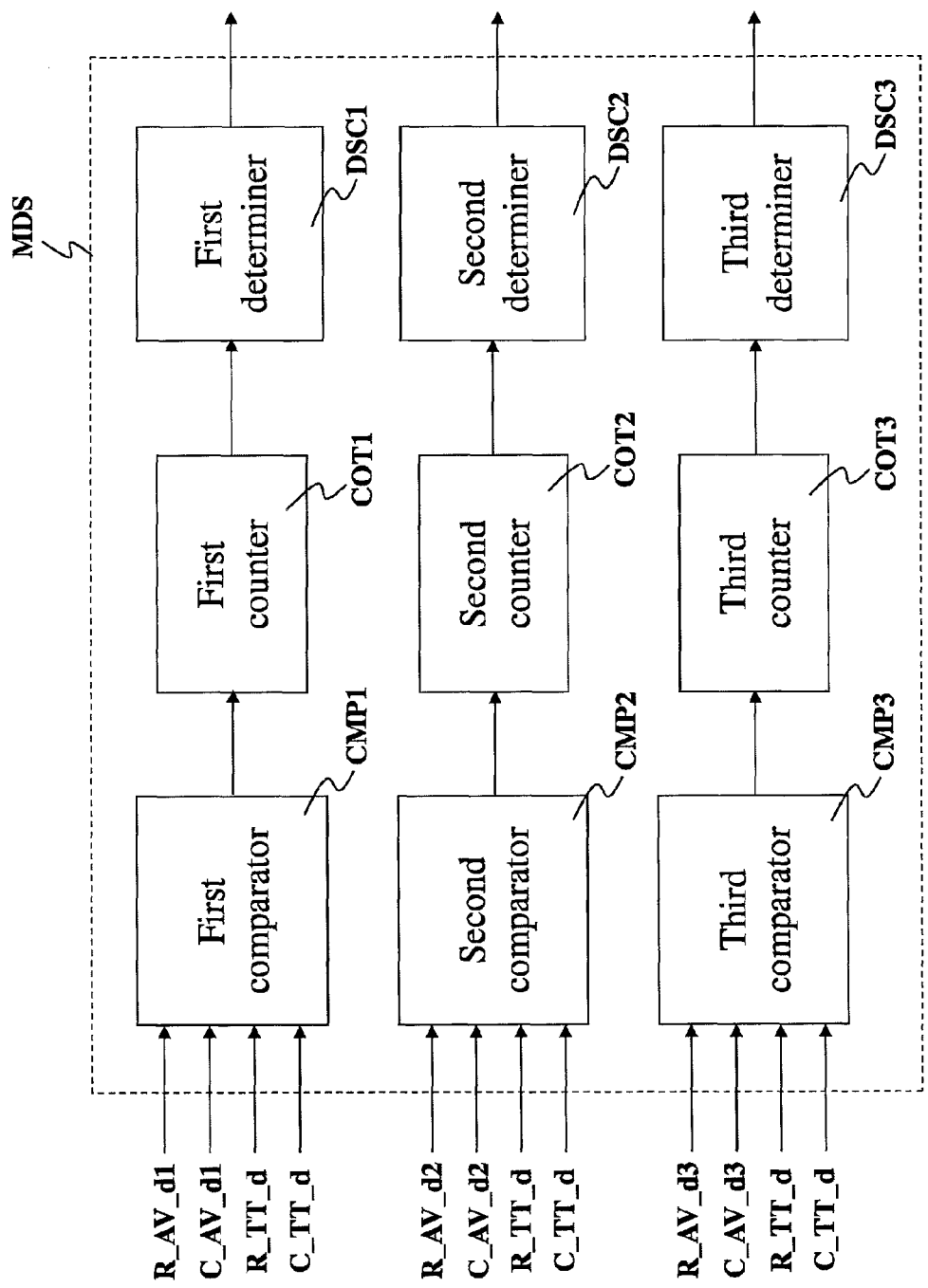
FIG. 11 is a detailed block diagram showing another configuration of the malfunction determination unit in FIG. 3.

FIG. 11 is a detailed block diagram showing another configuration of the malfunction determination unit MDS in FIG. 3.

The malfunction determination unit MDS includes, as shown in FIG. 11, first to third comparators CMP1 to CMP3, first to third counters COT1 to COT3, and first to third determiners DSC1 to DSC3. That is, in the configuration of FIG. 11, each of the number of the comparators CMP1 to CMP3, the number of the counters COT1 to COT3 and the number of the determiners DSC1 to DSC3 is the same as the number of the light sensor modules.

The first comparator CMP1 compares the first comparison unit average data C_AV_d1 and first reference unit average data R_AV_d1 from the data generation unit with each other and compares the comparison total average data C_TT_d and reference total average data R_TT_d from the data generation unit DGN with each other.

The second comparator CMP2 compares the second comparison unit average data C_AV_d2 and second reference unit average data R_AV_d2 from the data generation unit DGN with each other and compares the comparison total average data C_TT_d and reference total average data R_TT_d from the data generation unit DGN with each other.

The third comparator CMP3 compares the third comparison unit average data C_AV_d3 and third reference unit average data R_AV_d3 from the data generation DGN with each other and compares the comparison total average data C_TT_d and reference total average data R_TT_d from the data generation unit DGN with each other.

The operation of each of the first to third comparators CMP1 to CMP3 is substantially the same as that of the comparator CMP in FIG. 6.

The first counter COT1 increases a first check frame value or resets the first check frame value to an initial value, based on the comparison results from the first comparator CMP1.

The second counter COT2 increases a second check frame value or resets the second check frame value to the initial value, based on the comparison results from the second comparator CMP2.

The third counter COT3 increases a third check frame value or resets the third check frame value to the initial value, based on the comparison results from the third comparator CMP3.

That is, the operation of each of the first to third counters COT1 to COT3 is substantially the same as that of the counter COT in FIG. 6. For example, an rth counter (where r is any one of 1 to 3) adjusts an rth check frame value based on comparison results from an rth comparator. Namely, based on the comparison results, the rth counter increments the rth check frame value by one or resets the rth check frame value to the initial value (for example, 0).

The operations of the rth comparator and rth counter will hereinafter be described in detail with reference to the following example.

For example, when the comparison results from the rth comparator satisfy a condition that rth comparison unit average data is greater or less by 10% than rth reference unit average data and the comparison total average data C_TT_d is greater or less by 10% than the reference total average data R_TT_d, the rth counter increments the rth check frame value by one. In detail, when the comparison results from the first comparator CMP1 satisfy a condition that the first comparison unit average data C_AV_d1 is greater or less by 10% than the first reference unit average data R_AV_d1 and the comparison total average data C_TT_d is greater or less by 10% than the reference total average data R_TT_d, the first counter COT1 increments the first check frame value in the corresponding frame by one. Conversely, when this condition is not satisfied, the first counter COT1 resets the first check frame value to the initial value 0. The operation of each of the remaining second and third counters COT2 and COT3 is also the same as that of the first counter COT1.

The first determiner DSC1 compares the first check frame value from the first counter COT1 with a first predetermined threshold value and determines whether the first light sensor module IrSM_1 malfunctions, based on a result of the comparison.

The second determiner DSC2 compares the second check frame value from the second counter COT2 with a second predetermined threshold value and determines whether the second light sensor module IrSM_2 malfunctions, based on a result of the comparison.

The third determiner DSC3 compares the third check frame value from the third counter COT3 with a third predetermined threshold value and determines whether the third light sensor module IrSM_3 malfunctions, based on a result of the comparison.

That is, an rth determiner compares the rth check frame value from the rth counter with an rth predetermined threshold value and determines whether an rth light sensor module malfunctions, based on a result of the comparison. In other words, based on the comparison result, the rth determiner determines that the rth light sensor module malfunctions or the rth light sensor module is normal.

For example, when the rth check frame value is equal to the rth threshold value, the rth determiner finally determines that the rth light sensor module malfunctions. That is, at the moment that the rth check frame value reaches the rth threshold value while being incremented by one in every frame, the rth determiner determines that the rth light sensor module malfunctions. In other words, when the above condition is successively satisfied in frames of a number corresponding to the rth threshold value, the rth determiner finally determines that the rth light sensor module malfunctions.

In contrast, when the rth check frame value is less than the rth threshold value, the rth determiner determines that the rth light sensor module is normal. Here, the rth threshold value may be, for example, 50. In conclusion, in the case where the rth check frame value is successively increased in several frames (for example, 50 frames) (namely, in the case where malfunction is successively detected in the several frames), the rth determiner finally determines that the rth light sensor module malfunctions. The reason is that an abnormal signal discontinuously generated in less than 50 frames may be considered to be ignorable noise, not an abnormal signal such as static electricity.

When the rth determiner finally determines the rth light sensor module to malfunction, in this manner, the above-stated restart control unit RSC of FIG. 3 restarts the rth light sensor module. In this case, the first to third light sensor modules IrSM_1 to IrSM_3 may be selectively restarted according to whether they malfunction. For example, in the case where only malfunction of the first light sensor module IrSM_1 is detected and the remaining second and third light sensor modules IrSM_2 and IrSM_3 are normal, only the first light sensor module IrSM_1 is selectively restarted and the remaining second and third light sensor modules IrSM_2 and IrSM_3, which are normal, are maintained in operation.

On the other hand, when at least one of the three light sensor modules IrSM_1 to IrSM_3 is finally determined to malfunction by at least one of the first to third determiners DSC1 to DSC3 and then restarted by the restart control unit RSC, the reference data generator RDG generates reference data RF_d based on light sense data of pth to qth frames (where p is a natural number greater than n and q is a natural number greater than p) provided from each of the three light sensor modules IrSM_1 to IrSM_3. Namely, when at least one of the light sensor modules IrSM_1 to IrSM_3 malfunctions, it is restarted. In this case, it is required to generate new reference data RF_d based on other light sense data (light sense data corresponding to initial frames) generated from all the light sensor modules including the restarted light sensor module. For this reason, after the above restarting, the reference data generator RDG generates new reference data RF_d based on the light sense data of the pth to qth frames (for example, other initial ten frames). At this time, because a check frame value corresponding to the at least one light sensor module has also already reached a corresponding threshold value, it is reset to the initial value 0.

On the other hand, when the first to third determiners DSC1 to DSC3 determine that the first to third light sensor modules IrSM_1 to IrSM_3 are all normal, the comparison data generator CDG generates three comparison unit average data and one comparison total average data based on light sense data of a (k+1)th frame (for example, a twelfth frame) provided from each of the first to third light sensor modules IrSM_1 to IrSM_3. Namely, in the case where it is determined that all the light sensor modules are normal in the current frame (the eleventh frame), based on the analysis results of the light sense data of that frame, light sense data corresponding to a next frame are analyzed in the above manner for a determination as to whether the light sensor modules malfunction in the next frame. At this time, each check frame value is also reset to the initial value 0.

The mth to nth frames (or the pth to qth frames) correspond to consecutive frames immediately after power is applied to the touch display device or immediately after at least one light sensor module is restarted. In the above example, the mth to nth frames correspond to consecutive frames immediately after power is applied to the touch display device, and the pth to qth frames correspond to consecutive frames immediately after at least one light sensor module is restarted.

Figure 12:
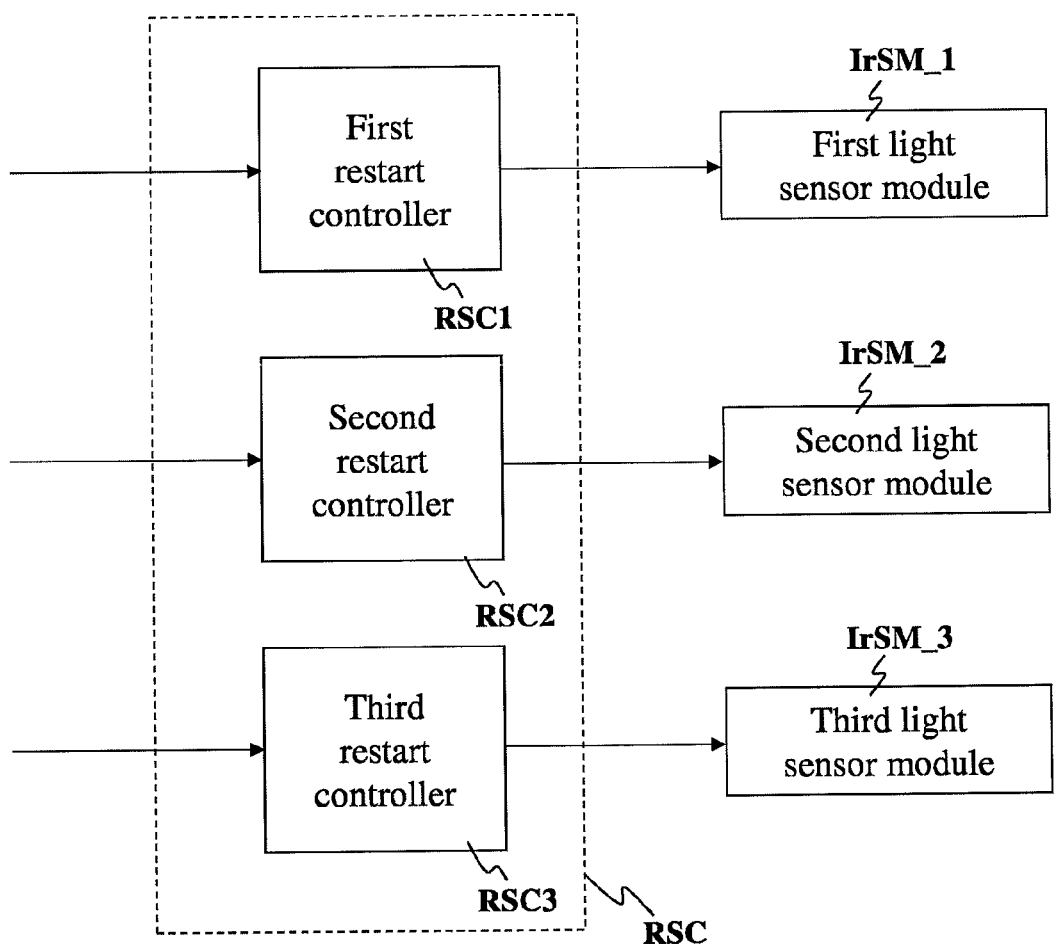
FIG. 12 is a detailed block diagram showing a configuration of a restart control unit which is controlled based on determination results from first to third determiners in FIG. 11.

FIG. 12 is a detailed block diagram showing a configuration of the restart control unit RSC which is controlled based on determination results from the first to third determiners DSC1 to DSC3 in FIG. 11.

The restart control unit RSC includes first to third restart controllers RSC1 to RSC3, as shown in FIG. 12.

The first restart controller RSC1 determines whether to restart the first light sensor module IrSM_1, based on the determination result from the first determiner DSC1.

The second restart controller RSC2 determines whether to restart the second light sensor module IrSM_2, based on the determination result from the second determiner DSC2.

The third restart controller RSC3 determines whether to restart the third light sensor module IrSM_3, based on the determination result from the third determiner DSC3.

In this manner, an rth restart controller determines whether to restart the rth light sensor module, based on the determination result from the rth determiner. Therefore, it is possible to individually control whether to restart the respective light sensor modules.

Figure 13:
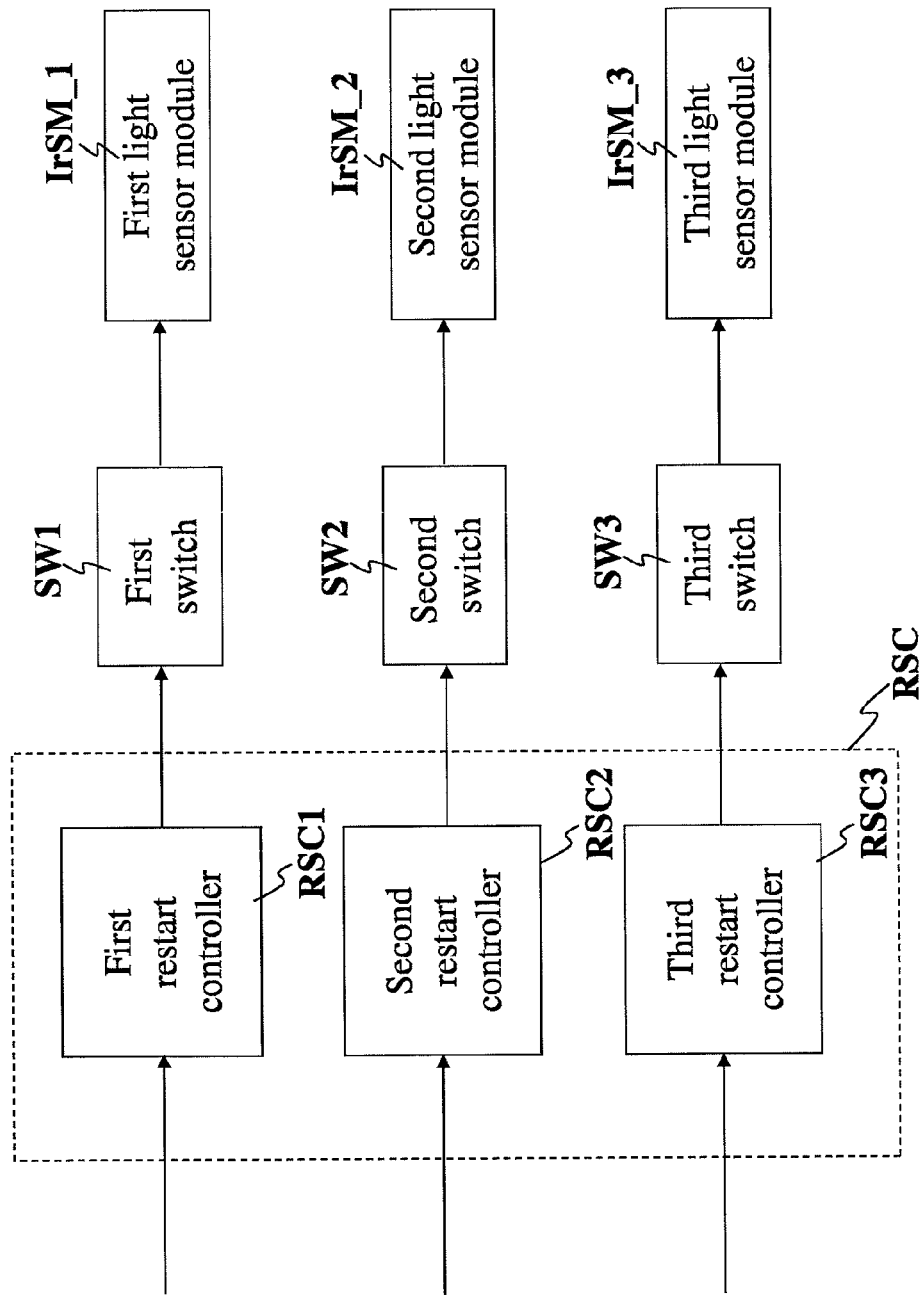
FIG. 13 is a detailed block diagram showing a configuration in which first to third switches are included in the configuration of FIG. 12.

FIG. 13 is a detailed block diagram showing a configuration in which first to third switches SW1 to SW3 are included in the configuration of FIG. 12.

As shown in FIG. 13, an rth switch may further be provided between the rth restart controller and the rth light sensor module in FIG. 12. In detail, the first switch SW1 may further be provided between the first restart controller RSC1 and the first light sensor module IrSM_1, the second switch SW2 may further be provided between the second restart controller RSC2 and the second light sensor module IrSM_2, and the third switch SW3 may further be provided between the third restart controller RSC3 and the third light sensor module IrSM_3.

Here, the first to third switches SW1 to SW3 in FIG. 13 are the same in configuration as the above-stated switch of FIG. 8.

The first switch SW1 supplies the restart signal or the sensor driving voltage to the first light sensor module IrSM_1 according to logic of a first restart determination signal from the first restart controller RSC1, the second switch SW2 supplies the restart signal or the sensor driving voltage to the second light sensor module IrSM_2 according to logic of a second restart determination signal from the second restart controller RSC2, and the third switch SW3 supplies the restart signal or the sensor driving voltage to the third light sensor module IrSM_3 according to logic of a third restart determination signal from the third restart controller RSC3. Here, because the respective restart controllers RSC1 to RSC3 are independently driven, the first to third restart determination signals may have different logic values. As a result, the operations of the first to third light sensor modules IrSM_1 to IrSM_3 are independently controlled.

In the case where the respective light sensor modules are independently controllable in this manner, the touch controller TCC may further perform the following operation. For example, when only the first light sensor module IrSM_1 among the three light sensor modules IrSM_1 to IrSM_3 is restarted and the remaining second and third light sensor modules IrSM_2 and IrSM_3 are normally driven, the touch controller TCC may determine presence/absence of a touch and generate touch coordinates, using only light sense data from the second and third light sensor modules IrSM_2 and IrSM_3. That is, even in a period in which the first light sensor module IrSM_1 is restarted, the touch controller TCC may accurately determine presence/absence of a touch and accurately generate touch coordinates, using the remaining two normal light sensor modules.

Figure 14:
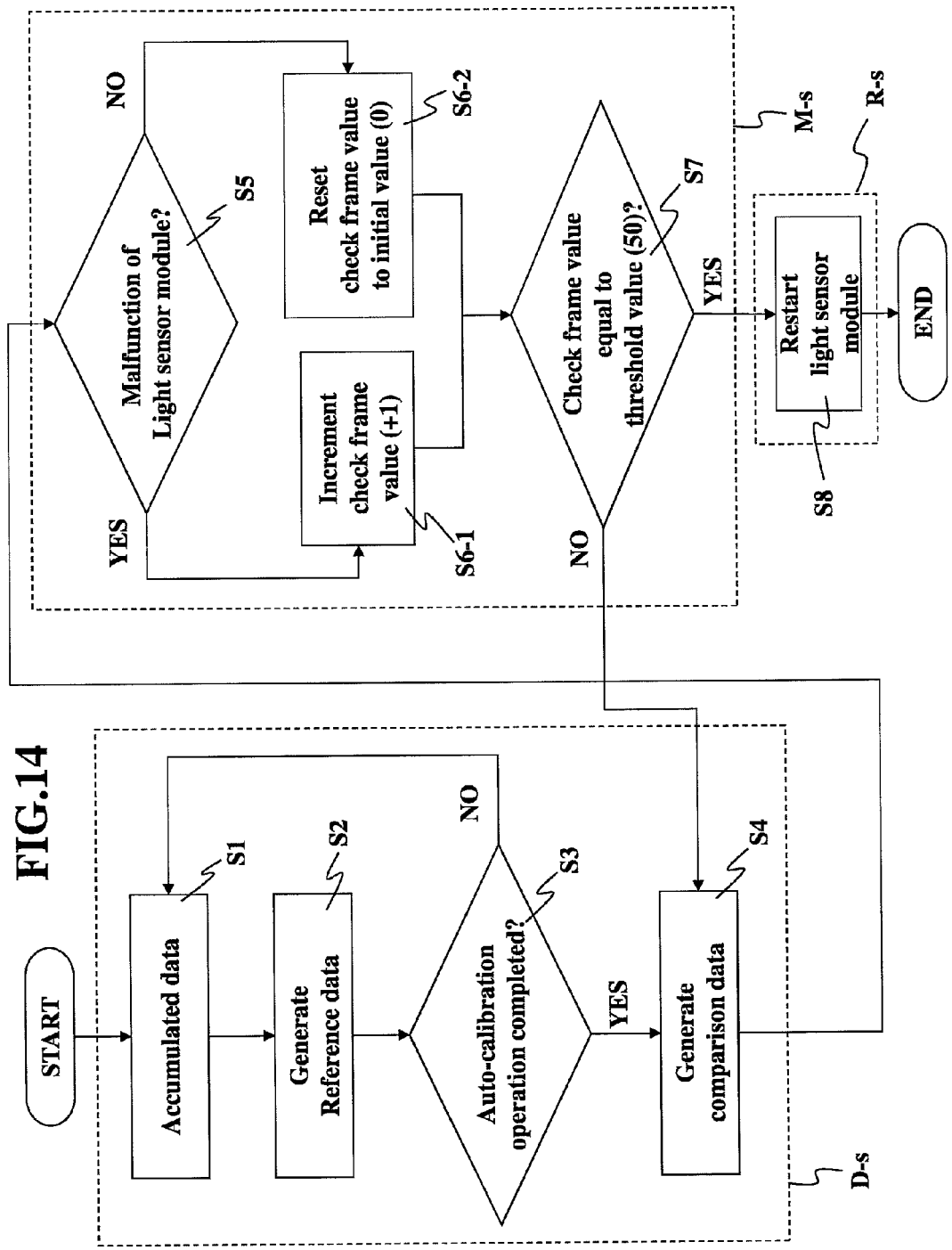
FIG. 14 is a flowchart illustrating a light sensor module recovery method of a touch display device according to a first embodiment of the present invention.

FIG. 14 is a flowchart illustrating a light sensor module recovery method of a touch display device according to a first embodiment of the present invention.

The light sensor module recovery method of the touch display device according to the first embodiment of the present invention includes an algorithm for recovering the first to third light sensor modules IrSM_1 to IrSM_3 shown in FIG. 1.

This light sensor module recovery method according to the first embodiment roughly includes a data generation step D-s, a malfunction determination step M-s, and a restart control step R-s.

At the data generation step D-s, reference data RF_d and comparison data CM_d are generated. Also, at this data generation step D-s, a determination as to whether to generate the comparison data CM_d is made according to whether an auto-calibration operation is performed. This data generation step D-s will hereinafter be described in detail.

First, at step S1, light sense data LS_mn_d1 to LS_mn_d3 of mth to nth frames provided from the three light sensor modules IrSM_1 to IrSM_3 are accumulated to generate accumulated data AC_d1 to AC_d3.

In detail, at step S1, the light sense data LS_mn_d1 of the mth to nth frames provided from the first light sensor module IrSM_1 are accumulated to generate the accumulated data AC_d1 of the first light sensor module IrSM_1. Also, at step S1, the light sense data LS_mn_d2 of the mth to nth frames provided from the second light sensor module IrSM_2 are accumulated to generate the accumulated data AC_d2 of the second light sensor module IrSM_2. Also, at step S1, the light sense data LS_mn_d3 of the mth to nth frames provided from the third light sensor module IrSM_3 are accumulated to generate the accumulated data AC_d3 of the third light sensor module IrSM_3. The accumulated data AC_d1 to AC_d3 generated at step S1 are the same as those generated by the above-stated accumulated data generator ADG, and a detailed description of step S1 will thus be omitted.

Thereafter, at step S2, reference data RF_d is generated based on the light sense data LS_mn_d1 to LS_mn_d3 of mth to nth frames provided from the three light sensor modules IrSM_1 to IrSM_3. This reference data RF_d includes three reference unit average data R_AV_d1 to R_AV_d3 and one reference total average data R_TT_d, which are generated at step S2 in the following manner.

That is, at step S2, the accumulated data AC_d1 of the first light sensor module IrSM_1 is divided by the number (for example, 500) of pixels formed in the first light sensor module IrSM_1 to generate the reference unit average data R_AV_d1 of the first light sensor module IrSM_1. Also, at step S2, the accumulated data AC_d2 of the second light sensor module IrSM_2 is divided by the number of pixels formed in the second light sensor module IrSM_2 to generate the reference unit average data R_AV_d2 of the second light sensor module IrSM_2. In a similar manner, at step S2, the accumulated data AC_d3 of the third light sensor module IrSM_3 is divided by the number of pixels formed in the third light sensor module IrSM_3 to generate the reference unit average data R_AV_d3 of the third light sensor module IrSM_3. In addition, at step S2, a sum of the three reference unit average data R_AV_d1 to R_AV_d3 is divided by 3 (the number of the light sensor modules) to generate the reference total average data R_TT_d. The reference unit average data R_AV_d1 to R_AV_d3 and the reference total average data R_TT_d generated at step S2 are the same as those generated by the above-stated reference data generator RDG, and a detailed description of step S2 will thus be omitted.

Next, at step S3, a determination is made as to whether the auto-calibration operation has been performed. If it is determined at step S3 that the auto-calibration operation has not been performed yet, the above steps S1 and S2 are sequentially performed again. Namely, whenever steps S1 and S2 are performed, accumulated data and reference data RF_d are generated with respect to light sense data of the current frame. As a result, steps S1 and S2 are sequentially repeated until the auto-calibration operation at step S3 is completed. Because the auto-calibration operation at step S3 is completed when a period of the mth to nth frames has elapsed, accumulated data and reference data RF_d are generated with respect to the light sense data of the mth to nth frames as stated above at a time that the auto-calibration operation at step S3 is completed.

This auto-calibration operation is the same as that performed by the above-stated touch controller TCC, and a description thereof will thus be omitted.

On the other hand, at step S3, performing the auto-calibration operation may be replaced with determining whether the current frame corresponds to one of the mth to nth frames.

After the above step S3 is performed, step S4 is performed.

At step S4, comparison data CM_d is generated based on light sense data LS_k_d1 to LS_k_d3 of a kth frame (where k is a natural number greater than n) provided from the three light sensor modules IrSM_1 to IrSM_3. This comparison data CM_d includes three comparison unit average data C_AV_d1 to C_AV_d3 and one comparison total average data C_TT_d, which are generated at step S4 in the following manner.

That is, at step S4, the light sense data LS_k_d1 of the kth frame (for example, an eleventh frame) provided from the first light sensor module IrSM_1 are summed up to generate sum data, and the sum data is divided by the number (for example, 500) of pixels formed in the first light sensor module IrSM_1 to generate the comparison unit average data C_AV_d1 of the first light sensor module IrSM_1. Also, at step S4, the light sense data LS_k_d2 of the kth frame (for example, the eleventh frame) provided from the second light sensor module IrSM_2 are summed up to generate sum data, and the sum data is divided by the number (for example, 500) of pixels formed in the second light sensor module IrSM_2 to generate the comparison unit average data C_AV_d2 of the second light sensor module IrSM_2. In a similar manner, at step S4, the light sense data LS_k_d3 of the kth frame (for example, the eleventh frame) provided from the third light sensor module IrSM_3 are summed up to generate sum data, and the sum data is divided by the number (for example, 500) of pixels formed in the third light sensor module IrSM_3 to generate the comparison unit average data C_AV_d3 of the third light sensor module IrSM_3. In addition, at step S4, a sum of the three comparison unit average data C_AV_d1 to C_AV_d3 is divided by 3 (the number of the light sensor modules) to generate the comparison total average data C_TT_d.

At the malfunction determination step M-s, a determination as to whether the light sensor modules malfunction is made based on a comparison between the generated reference data RF_d and the generated comparison data CM_d. At this malfunction determination step M-s, the determination as to whether the light sensor modules malfunction is made in every frame. Only when malfunction is successively detected from a certain light sensor module in frames of a number corresponding to a predetermined threshold value (for example, 50), the light sensor module is finally determined to malfunction. This malfunction determination step M-s will hereinafter be described in detail.

First, at step S5, a determination is made as to whether at least one of the three light sensor modules IrSM_1 to IrSM_3 malfunctions. To this end, at step S5, a determination is made as to whether the first comparison unit average data C_AV_d1 is greater or less by 10% than the first reference unit average data R_AV_d1, the second comparison unit average data C_AV_d2 is greater or less by 10% than the second reference unit average data R_AV_d2, the third comparison unit average data C_AV_d3 is greater or less by 10% than the third reference unit average data R_AV_d3 and the comparison total average data C_TT_d is greater or less by 10% than the reference total average data R_TT_d. When the result of this determination is true, the at least one light sensor module is determined at step S5 to malfunction.

When the determination result of step S5 is YES, step S6-1 is performed. At step S6-1, a check frame value is incremented by one.

In contrast, when the determination result of step S5 is NO, step S6-2 is performed. At step S6-2, the check frame value is reset to an initial value 0.

Then, at step S7, a determination is made as to whether the check frame value is equal to the predetermined threshold value 50. When the determination result of step S7 is NO, steps S4 to S7 are again performed. Namely, steps S4 to S7 are repeated as malfunction is successively detected in frames of a number corresponding to the threshold value. Ultimately, these steps S4 to S7 are repeated until the check frame value becomes equal to the threshold value. When the check frame value becomes equal to the threshold value, step S8 is performed.

Step S8 is the restart control step R-s. At step S8, the at least one light sensor module is restarted. Alternatively, at step S8, all the light sensor modules may be restarted.

The above steps S5 to S8 are the same as the operations performed by the above-stated comparator CMP, counter COT, determiner DSC and restart control unit RSC, and a detailed description thereof will thus be omitted.

Figure 15A:
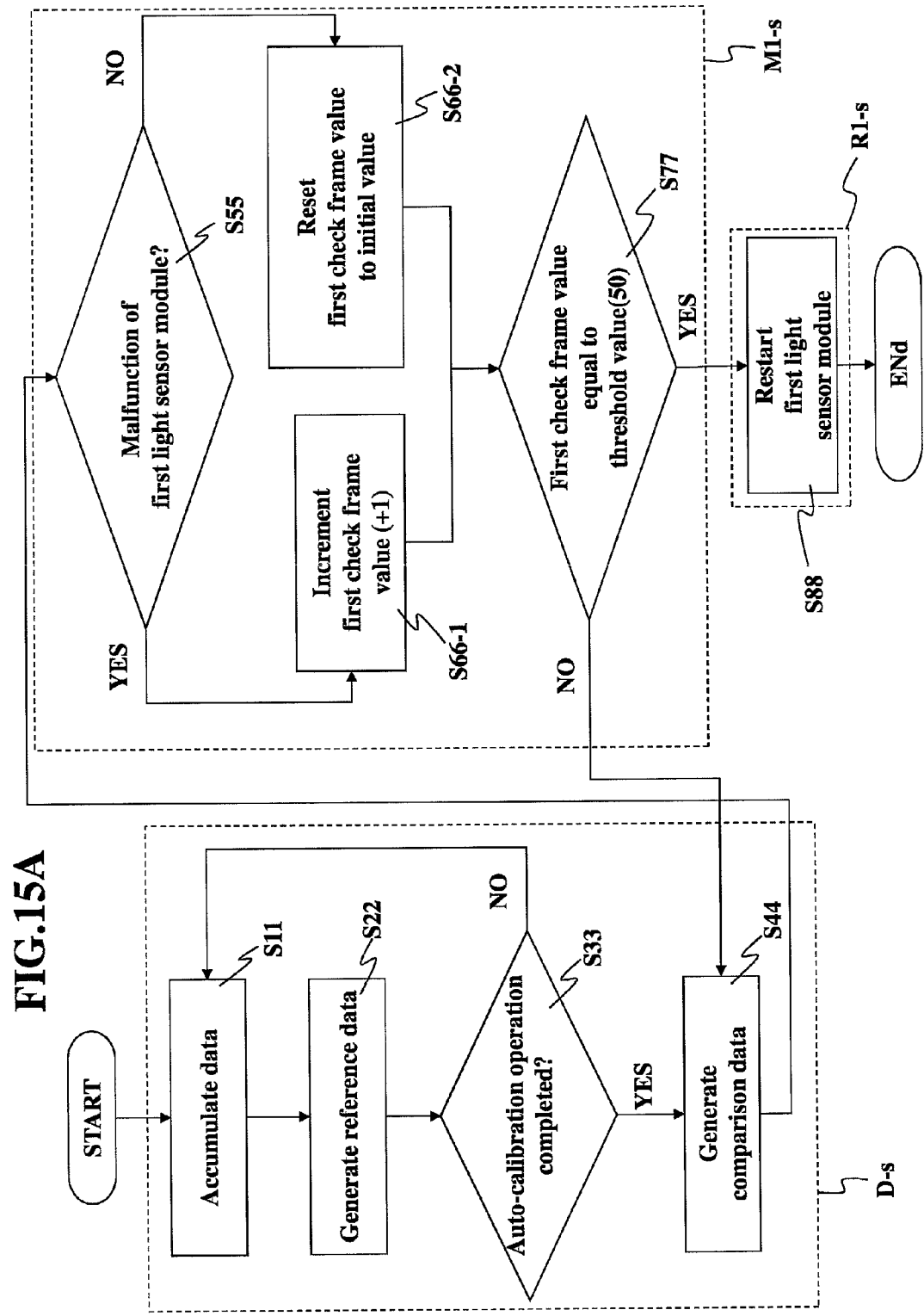

FIGS. 15A and 15B are flowcharts illustrating a light sensor module recovery method of a touch display device according to a second embodiment of the present invention.

The light sensor module recovery method of the touch display device according to the second embodiment of the present invention includes an algorithm for recovering the first to third light sensor modules IrSM_1 to IrSM_3 shown in FIG. 1.

This light sensor module recovery method according to the second embodiment roughly includes a data generation step D-s, a first malfunction determination step M1-s, a second malfunction determination step M2-s, a third malfunction determination step M3-s, a first restart control step R1-s, a second restart control step R2-s, and a third restart control step R3-s.

Here, steps S11, S22, S33 and S44 of the data generation step D-s in the second embodiment are the same as the above steps S1, S2, S3 and S4 of the data generation step D-s in the first embodiment, and a description thereof will thus be omitted.

At the first malfunction determination step M1-s, a determination as to whether the first light sensor module IrSM_1 malfunctions is made based on a comparison between the generated first reference unit average data R_AV_d1 and first comparison unit average data C_AV_d1 and a comparison between the generated reference total average data R_TT_d and comparison total average data C_TT_d. At this first malfunction determination step M1-s, the determination as to whether the first light sensor module IrSM_1 malfunctions is made in every frame. Only when malfunction is successively detected from the first light sensor module IrSM_1 in frames of a number corresponding to a predetermined threshold value (for example, 50), the first light sensor module IrSM_1 is finally determined to malfunction. This first malfunction determination step M1-s will hereinafter be described in detail.

First, at step S55, a determination is made as to whether the first light sensor module IrSM_1 malfunctions. To this end, at step S55, a determination is made as to whether the first comparison unit average data C_AV_d1 is greater or less by 10% than the first reference unit average data R_AV_d1 and the comparison total average data C_TT_d is greater or less by 10% than the reference total average data R_TT_d. When the result of this determination is true, the first light sensor module IrSM_1 is determined at step S55 to malfunction.

When the determination result of step S55 is YES, step S66-1 is performed. At step S66-1, a first check frame value is incremented by one.

In contrast, when the determination result of step S55 is no, step S66-2 is performed. At step S66-2, the first check frame value is reset to an initial value 0.

Then, at step S77, a determination is made as to whether the first check frame value is equal to a first predetermined threshold value 50. When the determination result of step S77 is NO, steps S44 to S77 are again performed. Namely, steps S44 to S77 are repeated as malfunction is successively detected in frames of a number corresponding to the first threshold value. Ultimately, these steps S44 to S77 are repeated until the first check frame value becomes equal to the first threshold value. When the first check frame value becomes equal to the first threshold value, step S88 is performed.

Step S88 is the first restart control step R1-s. At step S88, the first light sensor module IrSM_1 is restarted.

Steps S55, S66-1, S66-2, S77 and S88 of the first malfunction determination step M1-s and first restart control step R1-s are the same as the operations performed by the above-stated first comparator CMP1, first counter COT1, first determiner DSC1 and first restart controller RSC1, and a detailed description thereof will thus be omitted.

Similarly, steps S55, S66-1, S66-2, S77 and S88 of the second malfunction determination step M2-s and second restart control step R2-s are the same as the operations performed by the above-stated second comparator CMP2, second counter COT2, second determiner DSC2 and second restart controller RSC2, and a description thereof will thus be omitted.

Similarly, steps S55, S66-1, S66-2, S77 and S88 of the third malfunction determination step M3-s and third restart control step R3-s are the same as the operations performed by the above-stated third comparator CMP3, third counter COT3, third determiner DSC3 and third restart controller RSC3, and a description thereof will thus be omitted.

FIG. 16 is a flowchart illustrating a light sensor module recovery method of a touch display device according to a third embodiment of the present invention.

The light sensor module recovery method of the touch display device according to the third embodiment of the present invention includes an algorithm for recovering the first to third light sensor modules IrSM_1 to IrSM_3 shown in FIG. 1.

This light sensor module recovery method according to the third embodiment roughly includes a data generation step D-s, a malfunction determination step M-s, and a restart control step R-s.

Here, steps S555, S666-1, S666-2 and S777 of the malfunction determination step M-s in the third embodiment are the same as the above steps S5, S6-1, S6-2 and S7 of the malfunction determination step M-s in the first embodiment, and a description thereof will thus be omitted.

According to the third embodiment of the present invention, the auto-calibration operation is first performed, and the data accumulation step, the reference data RF_d generation step and the comparison data CM_d generation step are then performed after the auto-calibration operation is completed. Each step is the same as that in the first embodiment.

In the third embodiment, the auto-calibration operation is completed within a period corresponding to the mth to nth frames, and accumulated data and reference data RF_d are then generated with respect to several frames subsequent to the nth frame at steps S222 and S333.

On the other hand, although not shown, the data generation step D-s in FIG. 15A may be replaced with the above-stated data generation step D-s in FIG. 16.

FIG. 17 illustrates equations of accumulated data, reference unit average data and reference total average data in the present invention.

In FIG. 17, a parameter SUM_cam1 signifies first accumulated data of the first light sensor module IrSM_1, which is expressed by a sum of light sense data sum_cam1 of a current frame and accumulated light sense data MCU_DMA of previous frames.

Similarly, a parameter SUM_cam2 signifies second accumulated data of the second light sensor module IrSM_2, which is expressed by a sum of light sense data sum_cam2 of a current frame and accumulated light sense data MCU_DMA of previous frames.

Similarly, a parameter SUM_cam3 signifies third accumulated data of the third light sensor module IrSM_3, which is expressed by a sum of light sense data sum_cam3 of a current frame and accumulated light sense data MCU_DMA of previous frames.

A parameter ave_cam1 signifies first reference unit average data of the first light sensor module IrSM_1, which is expressed by a division of the first accumulated data by the number 500 of pixels in the first light sensor module IrSM_1.

Similarly, a parameter ave_cam2 signifies second reference unit average data of the second light sensor module IrSM_2, which is expressed by a division of the second accumulated data by the number 500 of pixels in the second light sensor module IrSM_2.

Similarly, a parameter ave_cam3 signifies third reference unit average data of the third light sensor module IrSM_3, which is expressed by a division of the third accumulated data by the number 500 of pixels in the third light sensor module IrSM_3.

A parameter total cam signifies reference total average data, which is expressed by a division of a sum of the first to third reference unit average data by the number 3 of the light sensor modules.

FIG. 18 illustrates, in the form of equations, the step of determining whether the light sensor modules malfunction.

In FIG. 18, a parameter each_cam_block_compare_check represents the result of a comparison between comparison data CM_d and reference data RF_d collected from each light sensor module. If this comparison result satisfies the above-stated condition (the condition proposed in the comparator CMP) (True), a parameter ESD_check_flag is activated (On). Here, the parameter ESD_check_flag signifies whether malfunction is detected, and is activated (On) if the above condition is satisfied (True).

If the parameter ESD_check_flag is activated, a parameter Continue_repeat_check, which signifies a check frame value, is incremented by one.

If the parameter Continue_repeat_check reaches a threshold value 50, a parameter ESD_RECOVER, which signifies restart, is activated (ON) to restart a corresponding light sensor module.

Figure 19:
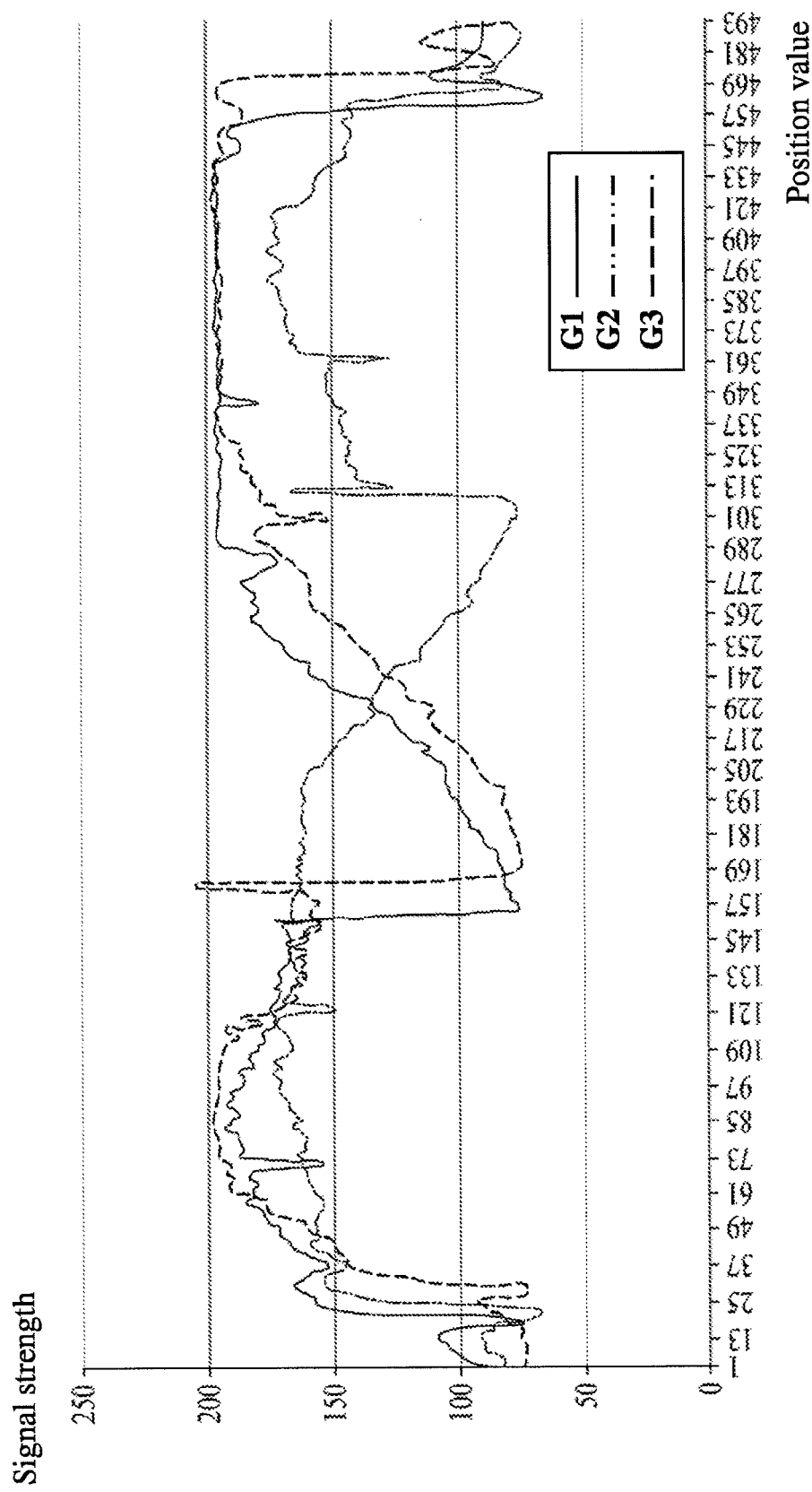
FIG. 19 is a waveform diagram of reference signals which are generated based on light sense data of an initial frame generated from each of first to third light sensor modules.

FIG. 19 is a waveform diagram of reference signals which are generated based on light sense data of an initial frame generated from each of the first to third light sensor modules IrSM_1 to IrSM_3.

In FIG. 19, a first reference signal G1 includes light sense data (500 light sense data) of one frame (an initial one frame) generated from the first light sensor module IrSM_1, a second reference signal G2 includes light sense data (500 light sense data) of one frame (an initial one frame) generated from the second light sensor module IrSM_2, and a third reference signal G3 includes light sense data (500 light sense data) of one frame (an initial one frame) generated from the third light sensor module IrSM_3.

Because the respective light sensor modules are different in installation position, light sense data collected for a period of the initial one frame may have somewhat different values by reference signals.

Figure 20:
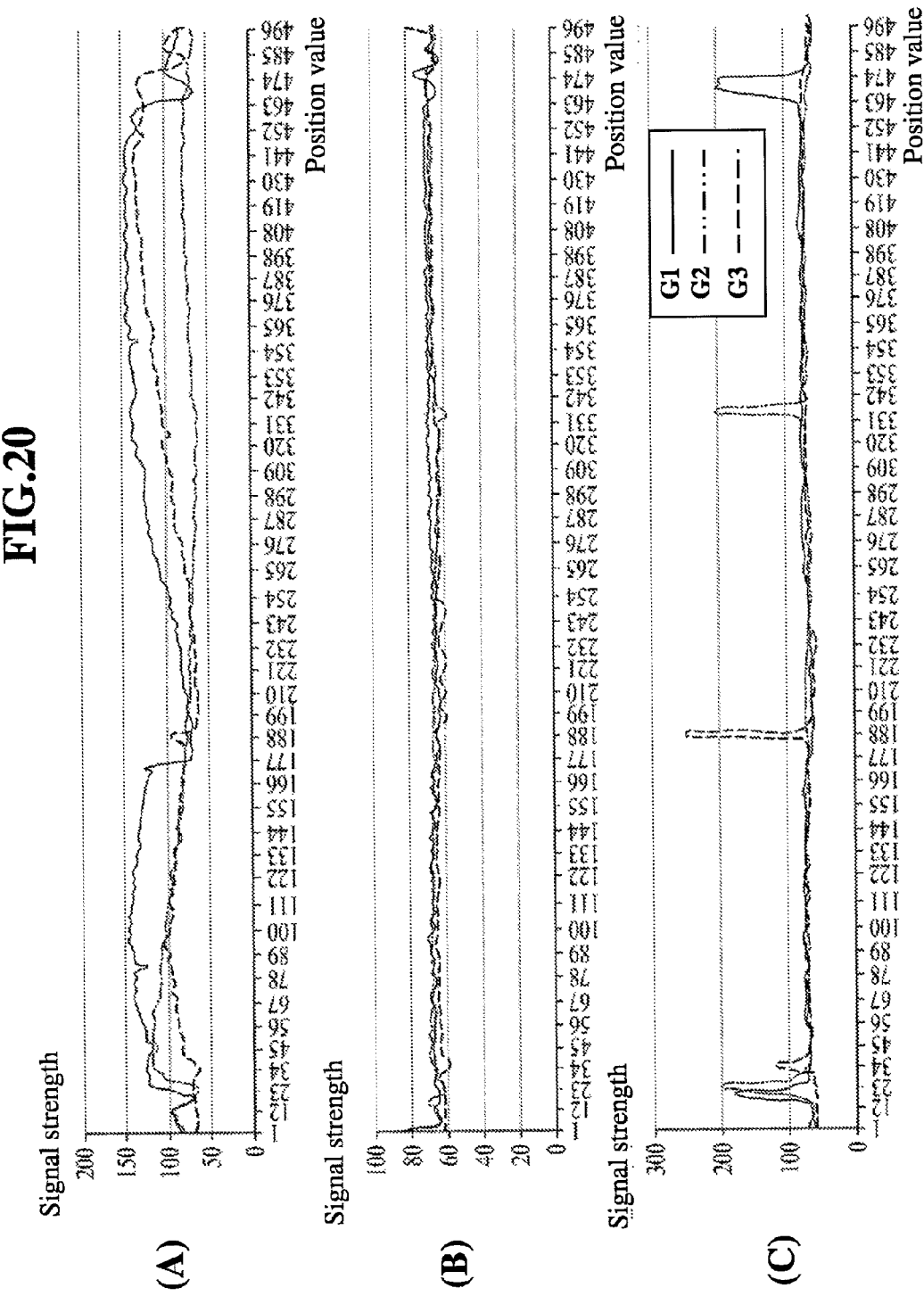
FIG. 20 is a waveform diagram illustrating variations in reference signals resulting from the influence of static electricity.

FIG. 20 is a waveform diagram illustrating variations in reference signals resulting from the influence of static electricity.

In FIGS. 20(a), 20(b) and 20(c), a first reference signal G1 includes light sense data generated from the first light sensor module IrSM_1, a second reference signal G2 includes light sense data generated from the second light sensor module IrSM_2, and a third reference signal G3 includes light sense data generated from the third light sensor module IrSM_3.

In the case where static electricity is introduced to all of the first to third light sensor modules IrSM_1 to IrSM_3, all of the light sense data included in the first to third reference signals G1 to G3 may somewhat fall in value, as shown in FIG. 20(a). As the static electricity becomes stronger, variation of the values increases.

On the other hand, in the case where static electricity is introduced to all of the first to third light sensor modules IrSM_1 to IrSM_3, all of the light sense data included in the first to third reference signals G1 to G3 may somewhat rise in value, as shown in FIG. 20(b). As the static electricity becomes stronger, variation of the values increases.

On the other hand, in the case where static electricity is introduced to all of the first to third light sensor modules IrSM_1 to IrSM_3, the light sense data included in the first to third reference signals G1 to G3 may partially significantly rise in value and partially fall in value, as shown in FIG. 20(c).

In the present invention, even if a reference signal is distorted due to static electricity as shown in FIG. 20, this reference signal can be corrected to its normal state as shown in FIG. 19 by restarting a corresponding light sensor module.

As is apparent from the above description, a touch display device and a light sensor module recovery method thereof according to the present invention have effects as follows.

A malfunctioning one of light sensor modules is found out by monitoring the operating states of the light sensor modules in real time. Then, the malfunctioning light sensor module is restarted such that it normally operates. Therefore, according to the present invention, even if an external abnormal signal such as static electricity is introduced to the light sensor modules, it is possible to accurately calculate touch coordinates.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A touch display device comprising:
    i light sensor modules connected to a memory and including a light emitting diode and a photosensor, where the i light sensor modules sense a touch applied to a touch display panel, and i is a natural number greater than 1; and
    a malfunction recovery circuit connected to the memory and the i light sensor modules, and including a data generation unit, a malfunction determination unit, and a restart control unit, wherein the malfunction recovery circuit is configured to:
    generate reference data based on light sense data of mth to nth frames provided from each of the i light sensor modules, and generate comparison data based on light sense data of a kth frame provided from the each of the i light sensor nodules, k being a natural number greater than n;
    compare the generated comparison data with the generated reference data, and determine whether the i light sensor modules malfunction, based on a result of comparing the generated comparison data with the generated reference data;
    determine whether to restart at least one of the i light sensor modules, based on a result of determining whether the i light sensor modules malfunction;
    accumulate the light sense data of the mth to nth frames provided from the each of the i light sensor modules to generate i accumulated data of the i light sensor modules;
    divide each of the i accumulated data by the number of pixels formed in the corresponding light sensor module to generate i reference unit average data, and divide a sum of the i reference unit average data by i to generate reference total average data; and
    sum up the light sense data of the kth frame provided from the each of the i light sensor modules to generate i sum data of the i light sensor modules, divide each of the i sum data by the number of the pixels formed in the corresponding light sensor module to generate i comparison unit average data of the i light sensor modules, and divide a sum of the i comparison unit average data by i to generate comparison total average data,
    wherein the i reference unit average data and the reference total average data are included in the reference data,
    wherein the i comparison unit average data and the comparison total average data are included in the comparison data, and
    wherein the malfunction recovery circuit further comprises i switches each of which selects any one of a restart signal and a sensor driving voltage based on the determination of whether to restart at least one of the i light sensor modules and the selected one is transmitted to a corresponding one of the i light sensor nodules.

2. The touch display device according to claim 1, wherein the malfunction recovery circuit determines whether each of the i light sensor modules malfunctions, based on whether static electricity is introduced to a corresponding one of the i light sensor modules.

3. The touch display device according to claim 1, wherein the malfunction determination unit of the malfunction recovery circuit comprises a comparator, a counter and a determiner, and
    wherein the malfunction recovery circuit is further configured to:
    compare, via the comparator, each of the i comparison unit average data from the data generation unit with a corresponding one of the i reference unit average data from the data generation unit and compares the comparison total average data with the reference total average data;
    increase, via the counter, a check frame value or reset the check frame value to an initial value, based on comparison results from the comparator; and
    compare the check frame value from the counter with a predetermined threshold value and determine that the at least one of the i light sensor modules malfunctions or the i light sensor modules are normal, based on a result of comparing the check frame value from the counter with the predetermined threshold value;
    generate reference data based on light sense data of pth to qth frames provided from each of the i light sensor modules when it is determined that the at least one light sensor module malfunctions, p being a natural number greater than n and q being a natural number greater than p; and generate i comparison unit average data and comparison total average data based on light sense data of a (k+1)th frame provided from each of the i light sensor modules when it is determined that the i light sensor modules are normal.

4. The touch display device according to claim 3, wherein the malfunction recovery circuit determines that the at least one of the i light sensor modules malfunctions, when the check frame value is equal to the threshold value, and determines that the i light sensor modules are normal, when the check frame value is less than the threshold value.

5. The touch display device according to claim 4, wherein the malfunction recovery circuit resets the check frame value to the initial value when the check frame value is equal to the threshold value.

6. The touch display device according to claim 5, wherein the malfunction recovery circuit increments the check frame value by one when the comparison results from the comparator satisfy a condition that each of the i comparison unit average data is greater or less by 10% than the corresponding one of the i reference unit average data and the comparison total average data is greater or less by 10% than the reference total average data, and resets the check frame value to the initial value when the comparison results from the comparator do not satisfy the condition.

7. The touch display device according to claim 5, wherein the malfunction recovery circuit restarts all of the i light sensor modules when it is determined that the at least one of the i light sensor modules malfunctions.

8. The touch display device according to claim 3, wherein the malfunction recovery circuit restarts the at least one of the i light sensor modules when it is determined that the at least one light sensor module malfunctions.

9. The touch display device according to claim 1, wherein the mth to nth frames are generated immediately after power is applied to the touch display device or immediately after the at least one of the i light sensor modules is restarted.

10. The touch display device according to claim 1, wherein the restart signal comprises an initialization voltage and the sensor driving voltage, the initialization voltage and the sensor driving voltage being sequentially generated, and
wherein the initialization voltage is generated ahead of the sensor driving voltage.

11. The touch display device according to claim 1, further comprising a touch controller that calculates coordinates of the touch based on the light sense data provided from the i light sensor modules,
wherein the light sense data provided from the i light sensor modules are stored in a memory of the touch controller, and
wherein the light sense data stored in the memory are read by the data generation unit and the touch controller.

12. The touch display device according to claim 11, wherein the touch controller temporarily stops a touch presence/absence determination operation and a touch coordinates calculation operation for a predetermined period of time when the at least one light sensor module is restarted.

13. The touch display device according to claim 12, wherein the predetermined period of time is 2 seconds or less.

14. The touch display device according to claim 1, further comprising a touch controller that calculates coordinates of the touch based on the light sense data provided from the i light sensor modules and performs an auto-calibration operation for the i light sensor modules,
wherein the auto-calibration operation of the touch controller is performed ahead of a data generation operation of the malfunction recovery circuit or in a period between a reference data generation operation and a comparison data generation operation of the malfunction recovery circuit.

15. The touch display device according to claim 1, wherein each of the i light sensor modules is an infrared sensor module, the infrared sensor module sensing the touch using an infrared ray.

16. The touch display device according to claim 1, wherein the malfunction determination unit of the malfunction recovery circuit comprises first to ith comparators, first to ith counters, and first to ith determiners, and
wherein the malfunction recovery circuit is further configured to:
compare, using each of the first to ith comparators, a corresponding one of the i comparison unit average data with a corresponding one of the i reference unit average data and compare the comparison total average data with the reference total average data;
increase, using each of the first to ith counters, a corresponding check frame value or resets the corresponding check frame value to an initial value, based on comparison results from a corresponding one of the first to ith comparators;
compare the check frame value from a corresponding one of the first to ith counters with a predetermined threshold value and determine whether a corresponding one of the i light sensor modules malfunctions, based on a result of comparing the check frame value from the corresponding one of the first to ith counters with the predetermined threshold value;
generate reference data based on light sense data of pth to qth frames provided from each of the i light sensor modules when the corresponding light sensor module is determined to malfunction, p being a natural number greater than n and q being a natural number greater than p; and
generate i comparison unit average data and comparison total average data based on light sense data of a (k+1)th frame provided from each of the i light sensor modules when it is determined that the i light sensor modules are normal.

17. The touch display device according to claim 16, wherein an rth one of the counters, where r is any one of 1 to i, increments the corresponding check frame value by one when the comparison results from an rth one of the comparators satisfy a condition that the comparison unit average data of an rth one of the light sensor modules is greater or less by 10% than the reference unit average data of the rth light sensor module and the comparison total average data is greater or less by 10% than the reference total average data, and resets the corresponding check frame value to the initial value when the comparison results from the rth comparator do not satisfy the condition.

18. The touch display device according to claim 17, wherein the restart control unit comprises first to ith restart controllers and each of the restart controllers determines whether to restart the corresponding light sensor module, based on a determination result from a corresponding one of the first to ith determiners.

19. The touch display device according to claim 18, wherein an rth one of the restart controllers, where r is any one of 1 to i, restarts the rth light sensor module when it is determined that the rth light sensor module malfunctions.

20. The touch display device according to claim 19, further comprising a touch controller that calculates coordinates of the touch based on the light sense data provided from the i light sensor modules,
   wherein the touch controller, when any one of the i light sensor modules is restarted and the remaining two or more light sensor modules are normally driven, calculates the touch coordinates using the light sense data from the remaining two or more light sensor modules.

21. The touch display device according to claim 19, further comprising a touch controller that calculates coordinates of the touch based on the light sense data provided from the i light sensor modules,
   wherein the touch controller temporarily stops a touch coordinates calculation operation for a predetermined period of time when at least two of the i light sensor modules are restarted.

* * * * *